(12) United States Patent
Tsuda

(10) Patent No.: US 10,544,742 B2
(45) Date of Patent: Jan. 28, 2020

(54) CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventor: Satoshi Tsuda, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 301 days.

(21) Appl. No.: 15/715,757

(22) Filed: Sep. 26, 2017

(65) Prior Publication Data

US 2018/0135539 A1    May 17, 2018

(30) Foreign Application Priority Data

Nov. 16, 2016    (JP) ................... 2016-223524

(51) Int. Cl.
| | | |
|---|---|---|
| *F02D 19/02* | (2006.01) | |
| *F02D 41/40* | (2006.01) | |
| *F02D 21/02* | (2006.01) | |

(52) U.S. Cl.
CPC ......... *F02D 19/024* (2013.01); *F02D 19/025* (2013.01); *F02D 21/02* (2013.01); *F02D 41/40* (2013.01); *F02D 2200/1015* (2013.01)

(58) Field of Classification Search
CPC ...... F02D 19/024; F02D 19/025; F02D 19/12; F02D 21/02; F02D 21/06; F02D 41/22
See application file for complete search history.

(56) References Cited

U.S. PATENT DOCUMENTS

| | | | | |
|---|---|---|---|---|
| 6,276,334 | B1* | 8/2001 | Flynn | F02B 19/14 |
| | | | | 123/435 |
| 2001/0017127 | A1* | 8/2001 | Flynn | F02B 1/12 |
| | | | | 123/435 |
| 2016/0215707 | A1* | 7/2016 | Miyamoto | F02F 3/26 |
| 2017/0204778 | A1* | 7/2017 | Yamada | F02B 25/04 |

FOREIGN PATENT DOCUMENTS

| | | |
|---|---|---|
| EP | 2 025 903 A1 | 2/2009 |
| JP | 2008-25405 | 2/2008 |
| JP | 2012-137031 | 7/2012 |
| JP | 2014-169664 A | 9/2014 |

* cited by examiner

*Primary Examiner* — Erick R Solis
*Assistant Examiner* — Anthony L Bacon
(74) *Attorney, Agent, or Firm* — Finnegan, Henderson, Farabow, Garrett & Dunner, LLP

(57) ABSTRACT

A control device for an internal combustion engine comprising a combustion control part controlling a fuel feed system and ozone feed system so as to form a difference in ozone concentration space-wise or time-wise in a combustion chamber 11 so that premixed gas burns by compression ignition in stages in the combustion chamber and an ozone malfunction judging part judging malfunction of the ozone feed system. The ozone malfunction judging part judges that the ozone feed system is malfunctioning when the self-ignition timing is retarded from the presumed self-ignition timing and the combustion noise is larger than the presumed combustion noise or when the self-ignition timing is advanced from the presumed self-ignition timing and the combustion noise is smaller than the presumed combustion noise.

3 Claims, 18 Drawing Sheets

CONTROL SYSTEM FOR INTERNAL COMBUSTION ENGINE

CROSS-REFERENCE TO RELATED APPLICATION

This application claims priority based on Japanese Patent Application No. 2016-223524 filed with the Japan Patent Office on Nov. 16, 2016, the entire contents of which are incorporated into the present specification by reference.

TECHNICAL FIELD

The present disclosure relates to a control device for an internal combustion engine.

BACKGROUND ART

JP2008-025405A discloses as a conventional control device for an internal combustion engine a device which diagnoses a malfunction of an ozone feed system for feeding ozone to a combustion chamber based on a cylinder pressure detected by a cylinder pressure sensor.

SUMMARY OF DISCLOSURE

However, in the case of an internal combustion engine having an operating region making a premixed gas burn by compression ignition to operate the engine body, for example, when the intake temperature deviates from the target value etc., a similar change occurs as when the ozone teed system malfunctions even when another system malfunctions. For this reason, there is the problem that it is not possible to differentiate between malfunctions of the ozone feed system and other systems and the precision of judgment of malfunction of the ozone feed system falls.

The present disclosure was made focusing on such a problem and has as its object suppressing the drop in precision of judgment of malfunction of the ozone feed system.

Solution to Problem

To solve this problem, according to one aspect of the present disclosure, there is provided a control device for controlling an internal combustion engine provided with an engine body, a fuel feed system configured to directly feed fuel to a combustion chamber of the engine body, and an ozone feed system configured to directly or indirectly feed ozone to the combustion chamber. This control device comprises a combustion control part configured to control the fuel feed system and ozone feed system in a predetermined operating region so as to cause a difference in ozone concentration in the combustion chamber space-wise or time-wise so that the premized gas burns in stages by compression ignition in the combustion chamber and an ozone malfunction judging part configured to judge malfunction of the ozone feed system in the predetermined, operating region. The ozone malfunction judging part comprises a self-ignition timing detecting part configured to detect a self-ignition timing of the premixed gas, a presumed, self-ignition timing calculating part configured to calculate a presumed self-ignition timing of the premixed gas, a combustion noise detecting part configured to detect combustion noise when making a premixed gas burn by compression ignition, and a presumed combustion noise calculating part configured to calculate presumed combustion noise when making the premixed gas burn by compression ignition. The ozone malfunction judging part is configured to judge that the ozone feed system is malfunctioning when the self-ignition timing is retarded from the presumed self-ignition timing and the combustion noise is larger than the presumed combustion noise or when the self-ignition timing is advanced from the presumed self-ignition timing and the combustion noise is smaller than the presumed combustion noise.

According to this aspect of the present disclosure, it is possible to judge if the ozone feed system is malfunctioning or if another system is malfunctioning, so it is possible to suppress a drop in precision of judgment of malfunction of the ozone feed system.

BRIEF DESCRIPTION OF DRAWINGS

FIG. 13 is a view showing one example of heat generation rate patterns when the amount of fuel injection is normal, when the amount of fuel injection is excessively small, and when the amount of fuel injection is excessively large.

DESCRIPTION OF EMBODIMENTS

Figure 1:
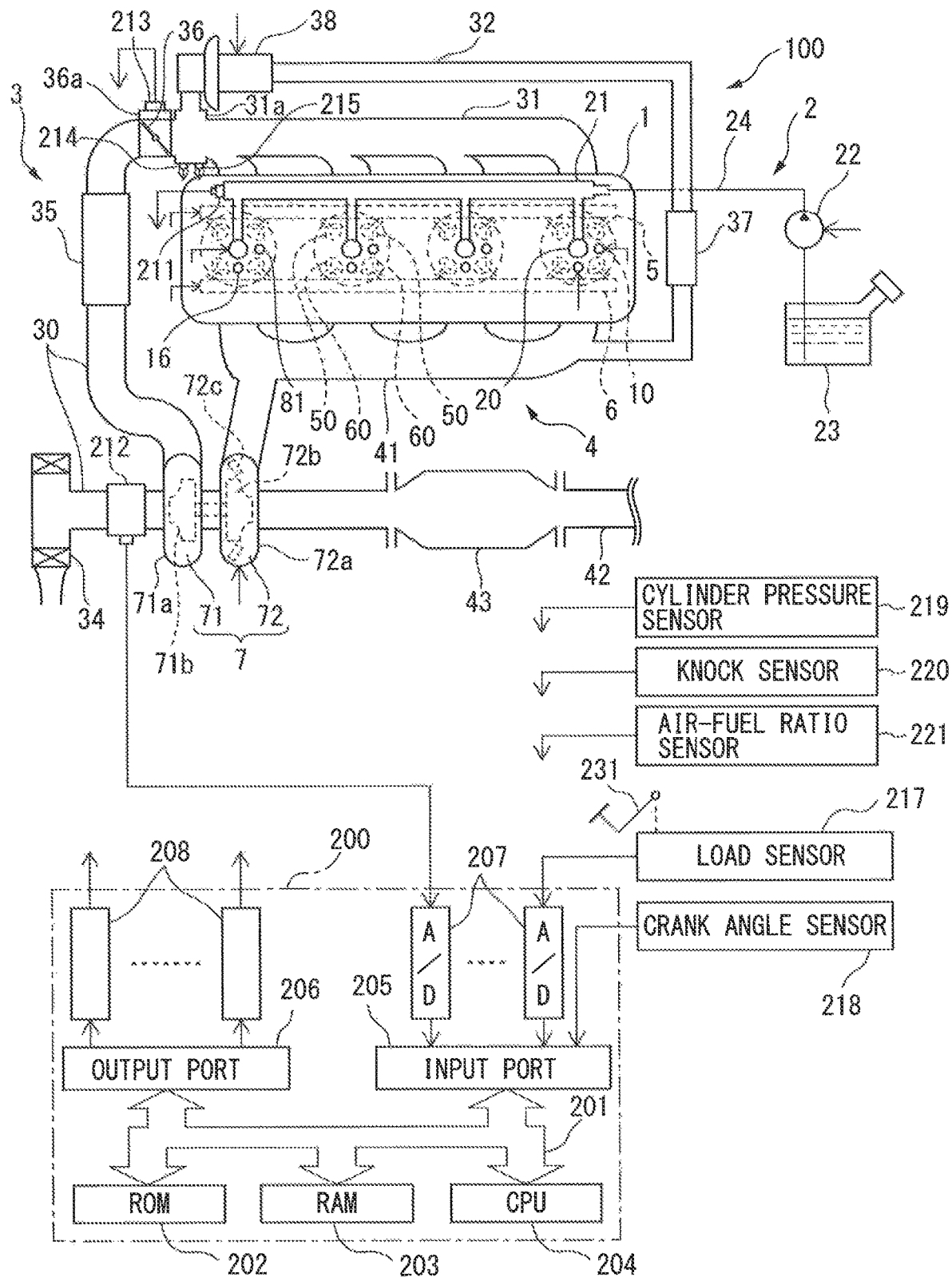
FIG. 1 is a schematic view of the configuration of an internal combustion engine and an electronic control unit controlling the internal combustion engine according to a first embodiment of the present disclosure.

Below, referring to the drawings, embodiments of the present disclosure will be explained in detail. Note that in the following explanation, the same components are assigned the same reference numerals.

First Embodiment

Figure 2:
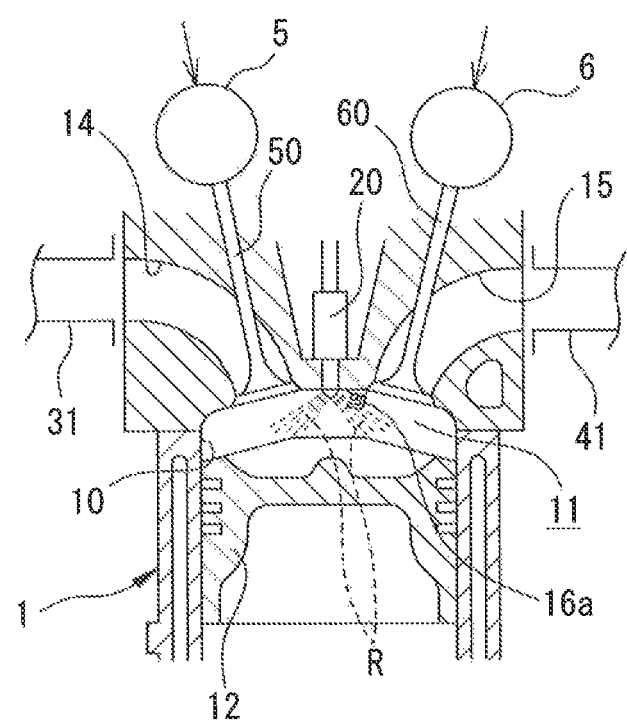
FIG. 2 is a cross-sectional view of an engine body of the internal combustion engine according to the first embodiment of the present disclosure.
Figure 3A:
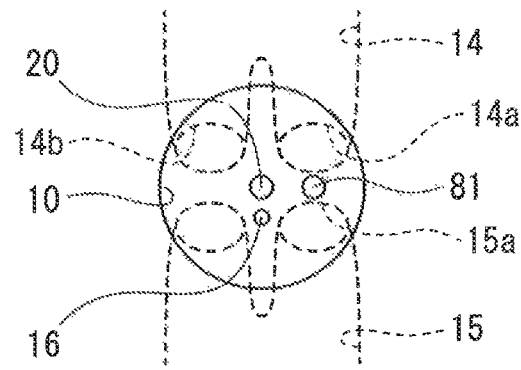
FIG. 3A is a schematic view of a cylinder of the internal combustion engine according to the first embodiment of the present disclosure seen from the cylinder head side.

First, referring to FIG. 1 to FIG. 3A, the configuration of the internal combustion engine 100 and the electronic control unit 200 controlling the internal combustion engine 100 according to the first embodiment of the present disclosure will be explained. FIG. 1 is a schematic view of the configuration of an internal combustion engine 100 according to the present, embodiment and an electronic control unit 200 controlling the internal combustion engine 100. FIG. 2 is a schematic cross-sectional view of an engine body 1 of the internal combustion engine 100. FIG. 3A is a schematic view of a cylinder 10 seen from the cylinder head side.

The internal combustion engine 100 is provided with an engine body 1 provided with a plurality of cylinders 10f a fuel feed system 2, an intake system 3, an exhaust system 4, an intake valve operating device 5, and an exhaust valve operating device 6.

The engine body 1 makes fuel burn in a combustion chamber 11 formed in a cylinder 10 (see FIG. 2) to, for example, generate power for driving a vehicle etc. The engine body 1 is provided with a single spark plug 16 as an ignition device for each cylinder so as to face the combustion chamber 11 of each cylinder 10 and is provided with a pair of intake valves 50 and a pair of exhaust valves 60 for each cylinder. As shown in FIG. 2, at the inside of each cylinder 10, a piston 12 is held reciprocating inside the cylinder 10 by receiving the combustion pressure. The piston 12 is connected with a crankshaft through a connecting rod. The crankshaft is used to convert the reciprocating motion of the piston 12 to rotary motion.

The fuel feed system 2 is provided with electronic control type fuel injectors 20, a delivery pipe 21, a supply pump 22, a fuel tank 23, and a pumping pipe 24.

The fuel injectors 20 are arranged at the top centers of the combustion chambers 11. One is provided at each cylinder 10 so as to face the combustion chamber 11 of that cylinder 10. As shown in FIG. 2, in the present embodiment, a spark plug 16 and fuel injector 20 are arranged adjoining each other so that an electrode part 16a of the spark plug 16 is positioned in a fuel injection region R of the fuel injector 20 or near the fuel injection region R. Due to this, it is made possible to perform so-called "spray guiding" where the fuel mist inside the fuel injection region R or near the fuel injection region R is ignited right after fuel injection. The opening time (injection amount) and opening timing (injection timing) of a fuel injector 20 are changed by a control signal from the electronic control unit 200. When the fuel injector 20 is opened, fuel is directly injected from the fuel injector 20 to the inside of the combustion chamber 11.

The delivery pipe 21 is connected through a pumping pipe 24 to the fuel tank 23. In the middle of the pumping pipe 24, a feed pump 22 is provided for pressurizing fuel stored in the fuel tank 23 and feeding it to the delivery pipe 21. The delivery pipe 21 temporarily stores the high pressure fuel pumped from the feed pump 22. If a fuel injector 20 is opened, the high pressure fuel stored in the delivery pipe 21 is directly injected from that fuel injector 20 to the inside of a combustion chamber 11. The delivery pipe 21 is provided with a fuel pressure sensor 211 for detecting the fuel pressure inside the delivery pipe 21, that is, the pressure (injection pressure) of fuel injected from a fuel injector 20 to the inside of the cylinder.

The feed pump 22 is configured to be able to be changed in discharge amount. The discharge amount of the feed pump 22 is changed by a control signal from the electronic control unit 200. By controlling the discharge amount of the feed pump 22, the fuel pressure inside the delivery pipe 21, that is, the injection pressure of each fuel injector 20, is controlled.

The intake device 3 is a device for guiding intake air to the inside of a combustion chamber 11 and is configured to be able to change the state of the intake air sucked into the combustion chamber 11 (intake pressure, intake temperature, amount of EGR (exhaust gas recirculation) gas). The intake device 3 comprises an intake passage 30, intake manifold 31, and EGR passage 32.

The intake passage 30 is connected at one end to an air cleaner 34 and is connected at the other end to an intake collector 31a of the intake manifold 31. At the intake passage 30, in order from the upstream side, an air flowmeter 212, compressor 71 of the exhaust turbocharger 7, intercooler 35, and throttle valve 36 are provided.

The air flowmeter 212 detects the flow rate of air flowing through the inside of the intake passage 30 and finally being taken into a cylinder 10.

The compressor 71 comprises a compressor housing 71a and a compressor wheel 71b arranged inside the compressor housing 71a. The compressor wheel 71b is driven to rotate by a turbine wheel 72b of the exhaust turbocharger 7 attached on the same shaft and compresses and discharges intake air flowing into the compressor housing 71a. At the turbine 72 of the exhaust turbocharger 7, a variable nozzle 72c for controlling the rotational speed of the turbine wheel 72b is provided. By using the variable nozzle 72c to control the rotational speed of the turbine wheel 72b, the pressure of the intake air discharged from inside the compressor housing 71a (supercharging pressure) is controlled.

The intercooler 35 is a heat exchanger for cooling the intake compressed by the compressor 71 and made high in temperature by, for example, running wind, cooling water, etc. Due to the intercooler 35, the temperature of the intake air taken into the cylinder (intake temperature) is controlled to a desired temperature.

The throttle valve 36 changes the passage cross-sectional area of the intake passage 30 to adjust the amount of intake air introduced into the intake manifold 31. The throttle valve 36 is driven to operate by a throttle actuator 36a. The throttle sensor 213 detects its opening degree (throttle opening degree).

The intake manifold 31 is connected to intake ports 14 formed in the engine body 1. Intake air flowing in from the intake passage 30 is distributed evenly to the combustion chambers 11 of the cylinders 10 through the intake ports 14. An intake collect 31a of the intake manifold 31 is provided with an intake pressure sensor 214 for detecting the pressure of the intake sucked into the cylinders (intake pressure) and an intake temperature sensor 215 for detecting the temperature of the intake sucked into the cylinders (intake temperature).

The EGK passage 32 is a passage for connecting the exhaust manifold 41 and the intake collector 31a of the intake manifold 31 and returning part of the exhaust discharged from the cylinders 10 to the intake collector 31a due to the pressure difference. Below, the exhaust flowing into the EGR passage 32 will be called the "outside EGR gas". By recirculating the outside EGR gas to the intake collector 31a and in turn the cylinders 10, it is possible to reduce the combustion temperature and suppress the discharge of nitrogen oxides ($NO_x$). The EGR passage 32 is provided with, in the order from the upstream side, an EGR cooler 37 and EGR valve 38.

The EGR cooler 37 is a heat exchanger for cooling the EGR gas by, for example, running air or cooling water.

The EGR valve 38 is a solenoid valve enabling continuous or stepwise adjustment of the opening degree. The opening degree is controlled by the electronic control unit 200 in accordance with the engine operating state. By controlling the opening degree of the EGR valve 38, the flow rate of the EGR gas recirculated to the intake collector 31a is adjusted.

The exhaust device 4 is a device for discharging exhaust from the cylinders and is comprised of an exhaust manifold 41 and exhaust passage 42.

The exhaust manifold 41 is connected to an exhaust port 15 formed at the engine body 1 and gathers together the exhaust discharged from the cylinders 10 for introduction into the exhaust passage 42.

In the exhaust passage 42, in order from the upstream side, the turbine 72 of the exhaust turbocharger 7 and an exhaust post-treatment device 43 are provided.

The turbine 72 is provided with a turbine housing 72a and a turbine wheel 72b arranged inside the turbine housing 72a. The turbine wheel 72b is driven to rotate by the energy of the exhaust flowing into the turbine housing 72a and drives a compressor wheel 71b attached on the same shaft.

At the outside of the turbine wheel 72b, the above-mentioned variable nozzle 72c is provided. The variable nozzle 72c functions as a throttle valve. The nozzle opening degree (valve opening degree) of the variable nozzle 72c is controlled by the electronic control unit 200. By changing the nozzle opening degree of the variable nozzle 72c, it is possible to change the flow rate of exhaust driving the turbine wheel 72b inside the turbine housing 72a. That is, by changing the nozzle opening degree of the variable nozzle 72c, it is possible to change the rotational speed of the turbine wheel 72b to change the supercharging pressure. Specifically, if reducing the nozzle opening degree of the variable nozzle 72c (throttling the variable nozzle 72c), the flow rate of the exhaust rises, the rotational speed of the turbine wheel 72b increases, and the supercharging pressure increases.

The exhaust post treatment device 43 is a device for cleaning the exhaust, then discharging it into the outside air and is provided with various types of exhaust purification catalysts for removing harmful substances, filters for trapping harmful substances, etc.

The intake valve operating device 5 is a device for driving operation of the intake valve 50 of each, cylinder 10 and is provided at the engine body 1. The intake valve operating device 5 according to the present embodiment is configured to for example drive operation of the intake valve 50 by an electromagnetic actuator so as to enable control of the operating timing of the intake valve 50 to any timing. However, the device is not limited to this. It is also possible to configure it to drive operation of the intake valve 50 by the intake camshaft and provide a variable valve operating mechanism at one end part of the intake camshaft to control the oil pressure and thereby change the relative phase angle of the intake camshaft with respect to the crankshaft and enable the operating timing of the intake valve 50 to be controlled to any timing.

The exhaust valve operating device 6 is a device for driving operation of the exhaust valve 60 of each cylinder 10 and is provided at the engine body 1. The exhaust valve operating device 6 according to the present embodiment is configured so as to make the exhaust valve 60 of the each cylinder 10 open during the exhaust, stroke and to enable opening even during the intake stroke in accordance with need. In the present embodiment, as such an exhaust valve operating device 6, an electromagnetic actuator controlled by the electronic control unit 200 is employed. By driving operation of the exhaust valve 60 of each cylinder 10 by an electromagnetic actuator, the operating timing and lift of the exhaust valve 60 are controlled to any timing and lift. Mote that, the exhaust valve operating device 6 is not limited to an electromagnetic actuator. For example, it is also possible to employ a valve operating device changing the operating time or lift of an exhaust valve 60 by changing the cam profile by oil pressure etc.

As shown in FIG. 1 and FIG. 3A, the internal combustion engine 100 according to the present embodiment is further provided with discharge plugs 81 forming the ozone feed system. One discharge plug 81 each is provided for each cylinder 10 so as to face the combustion chamber 11 of each cylinder 10. The discharge plug 81 is controlled by the electronic control unit 200 and discharges (silent discharge, corona discharge, streamer discharge, etc.) to thereby convert the oxygen in a combustion chamber 11 to ozone and feed ozone to the inside of the combustion chamber 11.

As shown in FIG. 3A, in the present embodiment, each discharge plug 81 is arranged offset from the center of a cylinder 10 and is arranged between a combustion chamber opening part 14a of an intake port 14 and a combustion chamber opening part 15a of an exhaust port 15. Further, in the present embodiment, the intake sucked in from one combustion chamber opening part 14a of the intake port 14 to the inside of the combustion chamber 11 and the intake sucked in from the other combustion chamber opening part 14b to the inside of the combustion chamber 11 are kept from being mixed inside the combustion chamber 11 by the intake port 14 being formed so that intakes sucked in from the combustion chamber opening part 14a and combustion chamber opening part 14b to the inside of the combustion chamber 11 flow inside the combustion chamber 11 tumbling separately.

Due to this, by using the discharge plugs 81 to for example generate ozone in the intake stroke, it is possible to make the ozone concentration in the combustion chamber 11 in the region where intake sucked in from the combustion chamber opening part 14a of the intake port 14 is mainly present higher than the ozone concentration in the region where intake sucked in from the combustion chamber opening part 14b of the intake port 14 is mainly present. In this way, in the present embodiment, the engine body 1 and ozone feed system are configured so as to feed ozone so that a difference in concentration is formed space-wise in the combustion chamber 11.

Note that, the method of feeding ozone so that a difference in concentration is formed space-wise in a combustion chamber 11 is not limited to such methods.

Figure 3B:
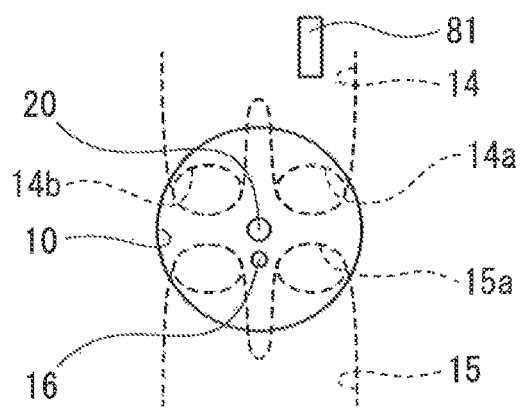
FIG. 3B is a schematic view of a cylinder of the internal combustion engine according to a first modification of the first embodiment of the present disclosure seen from the cylinder head side.
Figure 3C:
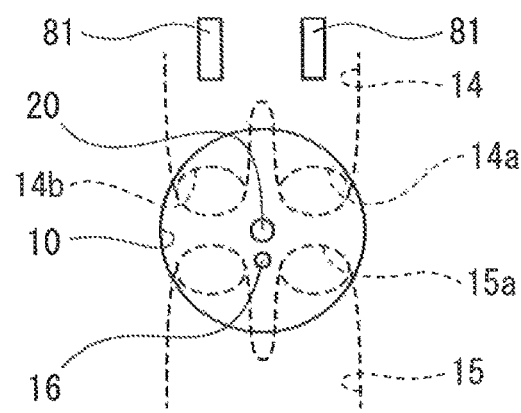
FIG. 3C is a schematic view of a cylinder of the internal combustion engine according to a second modification of the first embodiment of the present disclosure seen from the cylinder head side.

For example, like in the internal combustion engine 100 according to a first modification of the present embodiment of FIG. 3B, it is also possible to provide one discharge plug 81 in an intake port 14 so that ozone is contained in the intake sucked in from mainly the combustion chamber opening part 14a to the inside of the combustion chamber 11. Further, like in the internal combustion engine 100 according to the second modification of the present embodiment of FIG. 3C, it is also possible to provide two discharge plugs 81 so that ozone is contained in the intakes sucked in from the combustion chamber opening part 14a and combustion chamber opening part 14b to the inside of the combustion chamber 11 and to make the amounts of generation of ozone by the discharge plugs 81 different.

Further, while not shown, the ozone feed system, may also be configured so as to enable ozone to be fed so that a difference in concentration is formed inside a combustion chamber 11 by injecting ozone produced in advance to the inside of the combustion chamber 11 or intake port 14 by an injector etc.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

At the input port 205, in addition to the output signals of the above-mentioned combustion pressure sensor 211 etc., output signals of a cylinder pressure sensor 219 provided for each cylinder and detecting the internal pressure of the cylinder 10 (below, referred to as the "cylinder pressure"), a knock sensor 220 provided at the engine body 1 and detecting combustion noise of the engine body 1 (vibration force of combustion), an air-fuel ratio sensor 221 provided at the exhaust manifold 41 and detecting the air-fuel ratio of the exhaust, etc. are input through corresponding AD converters 207. The knock sensor 220 is a type of vibration sensor provided with a piezoelectric device and outputs a voltage corresponding to the vibration of the engine body 1 as the knock strength (combustion noise).

Further, at the input port 205, as a signal for detecting the engine load, the output voltage of a load sensor 217 generating an output voltage proportional to the amount of depression of an accelerator pedal 231 (below, referred to as the "amount of depression of the accelerator") is input through a corresponding AD converter 207. Further, at the input port 205, as a signal for calculating the engine speed etc., an output signal of a crank angle sensor 218 generating an output pulse every time the crankshaft of the engine body 1 rotates by for example 15° is input. In this way, at the input port 205, the output signals of various sensors required for controlling the internal combustion engine 100 are input.

The output port 206 is connected to the fuel injectors 20 and other controlled parts through the corresponding drive circuits 208.

The electronic control unit 200 outputs control signals for controlling the various controlled parts from the output port 206 to control the internal combustion engine 100 based on the output signals of the various types of sensors input to the input port 205. Below, the control of the internal combustion engine 100 performed by the electronic control unit 200 will be explained.

The electronic control unit 200 switches the operating mode of the engine body 1 to either a spark ignition operating mode (below, referred to as the "SI operating mode") or a compression ignition operating mode (below, referred to as the "CI operating mode") based on the engine operating state (engine rotational speed and engine load).

Figure 4:
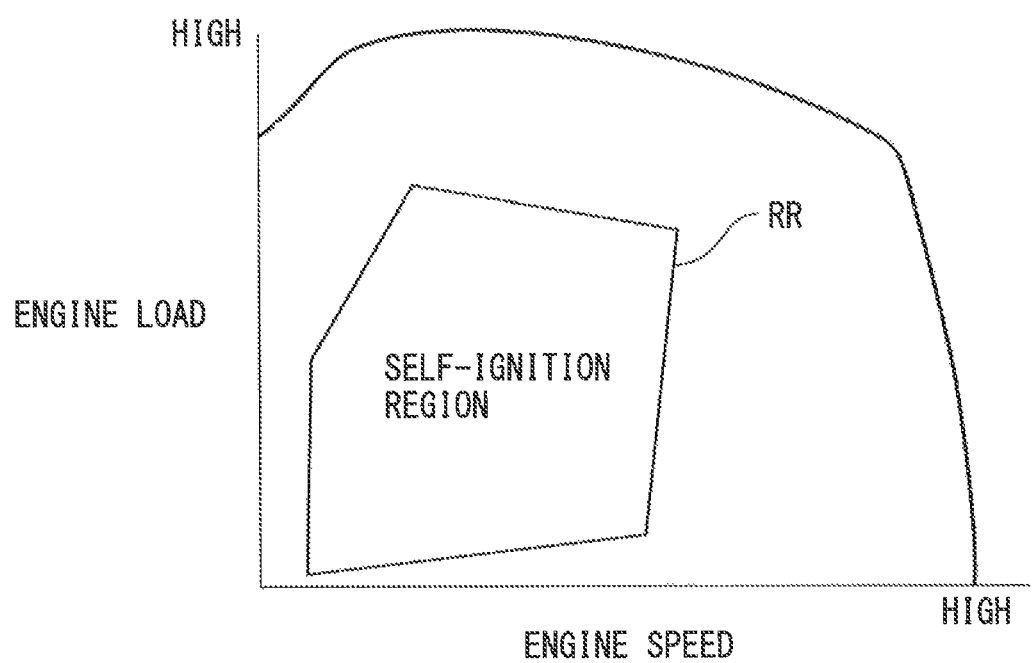
FIG. 4 is a view showing operating regions of an engine body.

Specifically, the electronic control unit 200 switches the operating mode to the CI operating mode if the engine operating state is in self-ignition region RR surrounded by the solid lines in FIG. 4 while switches the operating mode to the SI operating mode if it is in a region other than the self-ignition region RR. Further, the electronic control unit 200 controls the combustion according to the different operating modes.

When the operating mode is the SI operating mode, the electronic control unit 200 basically forms premixed gas of the stoichiometric air-fuel ratio or near the stoichiometric air-fuel ratio inside the combustion chamber 11, ignites it by the spark plug 16, and burns that premixed gas by flame propagation to operate the engine body 1.

Further, the electronic control unit 200 basically forms a premixed gas of a leaner air-fuel ratio (for example 30 to 40 or so) than the stoichiometric air-fuel ratio in the combustion chamber 11 when the operating mode is the CI operating mode and makes a premixed gas burn by compression ignition by "premixed gas compression ignition combustion" to operate the engine body 1. The present embodiment performs partially premixed combustion (RFC) forming a stratified premixed gas having a burnable layer at the center part inside the combustion chamber 11 and having an air layer around the cylinder inside walls as a premixed gas and burning this by compression ignition so as to operate the engine body 1.

The premixed gas may be burned by compression ignition even if the air-fuel ratio is made leaner than by burning by flame propagation and further can be burned even if making the compression ratio higher. For this reason, by burning the premixed gas by compression ignition, it is possible to improve the fuel efficiency and possible to improve the heat efficiency. Further, burning the premixed gas by compression ignition results in a lower combustion temperature compared with burning by flame propagation, so it is possible to suppress the generation of $NO_x$. Further, there is sufficient oxygen around the fuel, so the formation of unburned HC can be suppressed.

Figure 5A:
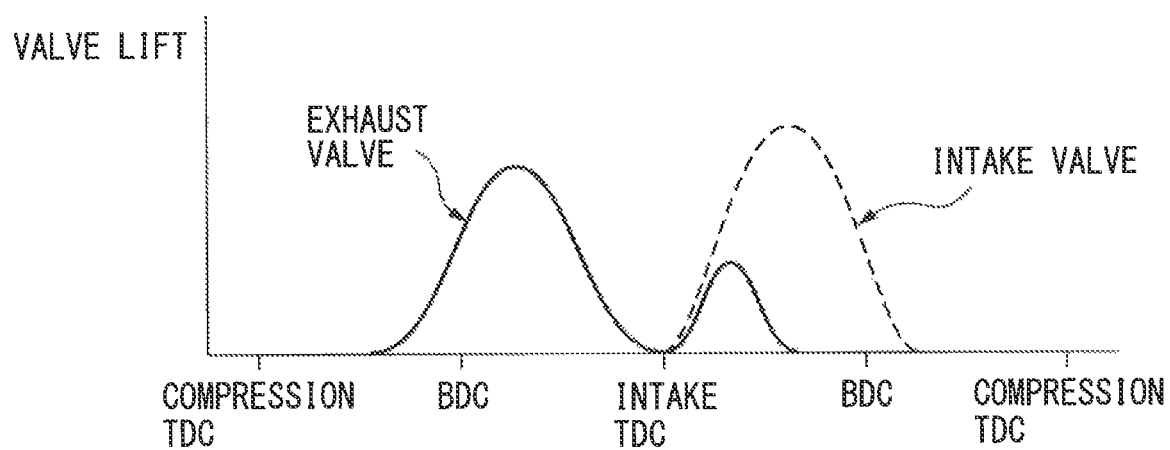
FIG. 5A is a view showing one example of an opening operation of intake valves and exhaust valves in a CI operating mode.
Figure 5B:
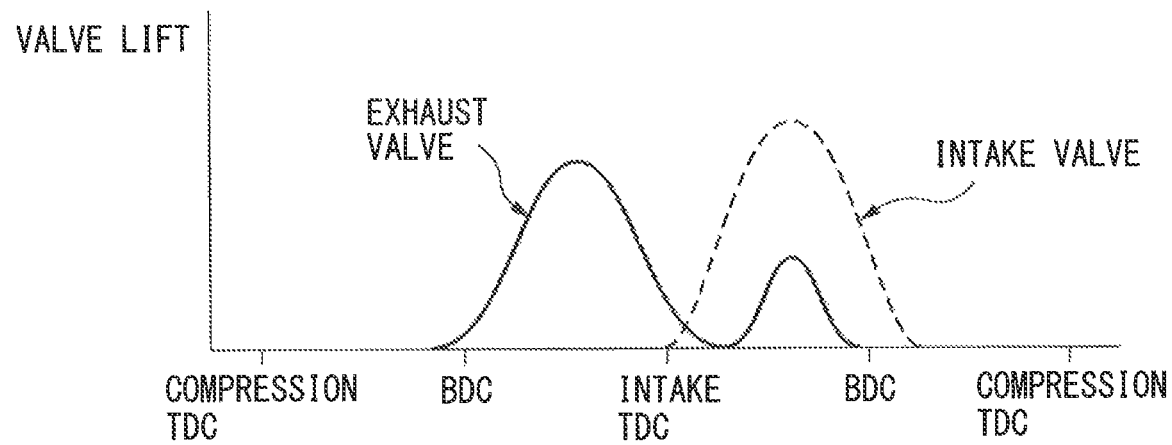
FIG. 5B is a view showing one example of an opening operation of intake valves and exhaust valves in a CI operating mode.

Note, to make the premixed gas burn by compression ignition, it is necessary to make the cylinder temperature rise to a temperature enabling self-ignition of the premixed gas. It is necessary to make the cylinder temperature a higher temperature than when making all of the premixed gas burn by flame propagation in the combustion chamber 11 like in the SI operating mode. For this reason, in the present embodiment, for example, as shown in FIG. 5A and FIG. 5B, during the CI operating mode, the exhaust valve operating device 6 is controlled so that the exhaust valve 60 opens not only in the exhaust stroke, but also in the intake stroke in accordance with need. In this way, by performing the operation of opening the exhaust valve two times again opening the exhaust valve 60 during the intake stroke, it is possible to suck back the high temperature exhaust discharged from a cylinder during the exhaust stroke to the same cylinder during the immediately following intake stroke. Due to this, the cylinder temperature is made to rise and the cylinder temperature of the each cylinder 10 is maintained at a temperature enabling burning of the premixed gas by compression ignition.

As shown in FIG. 5A, if opening the exhaust valve 60 when the amount of lift of the intake valve 50 is small, a large amount of exhaust can be sucked back into the same cylinder, so the cylinder temperature can be made to greatly rise. On the other hand, as shown in FIG. 5B, if opening the exhaust valve 60 after the lift of an intake valve 50 becomes larger by a certain extent, the exhaust is sucked back after air (fresh air) is sucked into the cylinder by a certain degree, so the amount of exhaust sucked back into the same cylinder can be suppressed and the amount of rise of the cylinder temperature can be suppressed.

In this way, it is possible to control the amount of rise of the cylinder temperature in accordance with the timing of performing double opening operation of the exhaust valve. In the present embodiment, the ratio of the amount of outside EGR gas in the amount of cylinder gas and the amount of exhaust sucked back into the same cylinder (below, referred to as the "amount of internal EGR gas") will be called the "EGR rate".

In this regard, if making the premised gas burn by compression ignition, the fuel dispersed inside the combustion chamber 11 self-ignites at numerous points at the same timing. For this reason, there is the problem that the combustion noise increases compared with the case of making the premixed gas burn by flame propagation.

Figure 6:
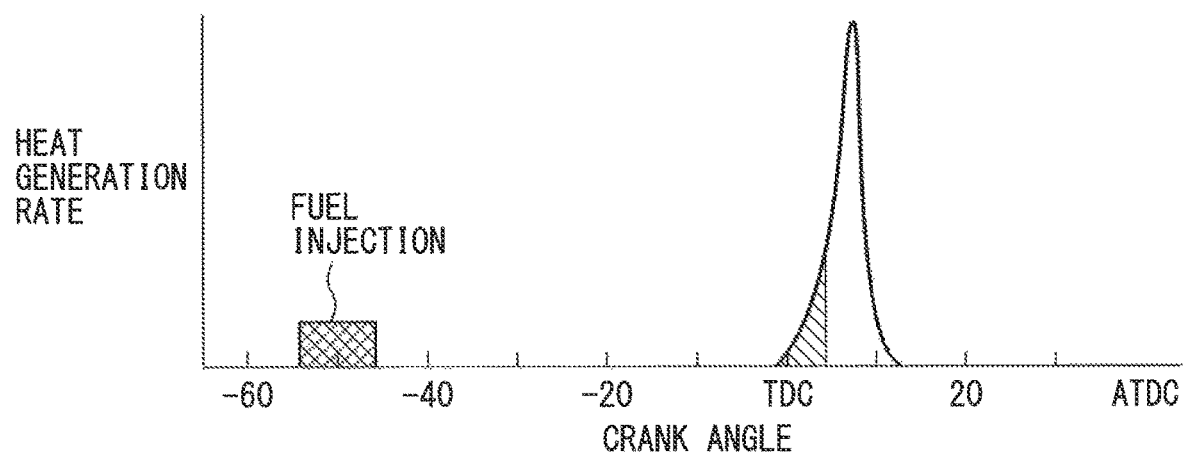
FIG. 6 shows the relationship between a crank angle and neat generation rate in the case of burning a premixed gas by compression ignition.

FIG. 6 is a view showing the relationship between the crank angle and the heat generation rate when injecting from the fuel injector 20 a predetermined amount of fuel corresponding to the engine load only one time at any timing from the intake stroke to the compression stroke (in the example of FIG. 6, −50° ATDC) to burn the premixed gas by compression ignition. The heat generation rate $(dQ/d\theta)$ $(J/°CA)$ is the amount of heat per unit crank angle generated due to combustion of the premixed gas, that is, the amount of heat generation Q per unit crank angle. Note that in the following explanation, the combustion waveform showing the relationship of this crank angle and heat generation rate will be called the "heat generation, rate pattern" when necessary.

As explained above, when making the premixed gas burn by compression ignition, fuel dispersed in the combustion chamber 11 self-ignites at numerous points at the same timing, so the combustion speed becomes faster and the combustion duration becomes shorter than when making the fuel burn by flame propagation. For this reason, as shown in FIG. 6, when making the premixed gas burn by compression ignition, the peak value of the heat generation rate pattern and the slope $(dQ/(d\theta)^2)$ at the initial stage of combustion of the heat generation rate pattern (region shown by hatching in FIG. 6) tend to become relatively large.

The combustion noise is correlated with the peak value and the slope at the initial stage of combustion of this heat generation rate pattern. The larger the peak value of the heat generation rate pattern and, further, the larger the slope at the initial stage of combustion, the greater it becomes. For this reason, when making the premixed gas burn by compression ignition, the combustion noise increases compared with when burning the premixed gas by flame propagation.

Here, as the method of reducing the peak value and the slope in the initial stage of combustion of the heat generation rate pattern to decrease the combustion noise, for example, there is the method of feeding ozone so that a difference of concentration occurs space-wise in the combustion chamber 11 and thereby providing a time difference and making the fuel burn by compression ignition in stages.

The ozone fed to the inside of the combustion chamber 11 is broken down if the temperature inside the combustion chamber 11 rises to a predetermined temperature (for example, from 500K to 600K or so) and a type of active species, that is, oxygen radicals, are generated. It is known that oxygen radicals act on fuel molecules to raise the self-ignitability of the fuel. The greater the amount of oxygen radicals present in the combustion chamber 11, the earlier the self-ignition timing of the premixed gas.

Therefore, by feeding ozone so that a difference in concentration is formed space-wise in the combustion chamber 11 like in the embodiment, it is possible to make the self-ignition timing of the premixed gas present in a region in the combustion chamber 11 of a relatively high ozone concentration (more strictly speaking the concentration of oxygen radicals) earlier than the self-ignition timing of the premixed gas present in the region in the combustion chamber 11 of a relatively low ozone concentration. That is, by feeding ozone so that a difference in concentration is formed space-wise inside the combustion chamber 11, it is possible to provide a time difference and burn the fuel by compression ignition in stages.

Further, on the other hand, as a modification of the present embodiment, for example it is also possible to feed ozone and fuel so that a difference in concentration is formed time-wise inside the combustion chamber 11 and thereby provide a time difference and burn the fuel by compression ignition in stages. That is, if performing primary fuel injection when the ozone concentration in the combustion chamber 11 is a predetermined value or more and performing secondary fuel injection when the ozone concentration then falls to less than the predetermined value, it is possible to make the self-ignition timing of the premixed gas comprised of mainly the primary fuel earlier than the self-ignition timing of the premixed gas comprised of mainly the secondary fuel. For this reason, even if feeding ozone and fuel so that a difference in concentration is formed time-wise inside the combustion chamber 11, it is possible to provide a time difference and burn the fuel by compression ignition in stages.

Figure 7:
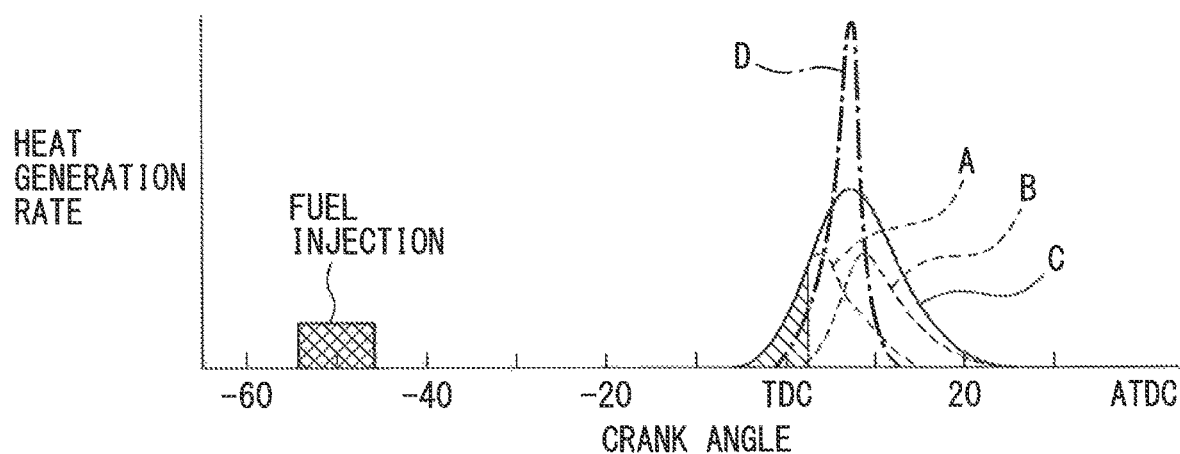
FIG. 7 is a view showing the relationship between a crank angle and heat generation rate when feeding ozone during an intake stroke so that a difference in concentration occurs space-wise in a combustion chamber while burning a premixed gas by compression ignition.

FIG. 7 is a view showing the relationship between the crank angle and heat generation rate when feeding ozone in the intake stroke so that a difference in concentration is formed space-wise inside the combustion chamber 11 while burning the premixed gas by compression ignition without changing the total amount of fuel injected from the fuel injector 20.

In FIG. 7, the heat generation rate pattern A is the heat generation rate pattern when the premixed gas present in a region inside the combustion chamber 11 with a relatively high ozone concentration (below, referred to as the "high ozone concentration region") burns by compression ignition. The heat generation rate pattern B is the heat generation rate pattern when the premixed gas present in a region inside the combustion chamber 11 with a relatively low ozone concentration (below, referred to as the "low ozone concentration region") burns by compression ignition. The heat generation rate pattern C is the actual heat generation rate pattern combining the heat generation rate pattern A and the heat generation rate pattern B. The heat generation rate pattern D is the heat generation rate pattern of FIG. 6 shown for comparison.

Inside the combustion chamber 11, if ozone is fed so that a difference of concentration is formed, as shown in the heat generation rate pattern A, the premixed gas present in the high ozone concentration region first self-ignites. Further, as shown in the heat generation rate pattern B, the premixed gas present in the low ozone concentration region self-ignites with a delay.

The peak values and the slopes in the initial stage of combustion of the heat generation rate pattern A and heat generation rate pattern B become smaller than the peak value and slope at the initial stage of combustion of the heat generation rate pattern D. This is because both in the case of FIG. 6 and the case of FIG. 7, the total amount of the fuel injection does not change, so compared with the amount of fuel contributing to the formation of the heat generation rate pattern D, the amount of fuel contributing to the formation of the heat generation rate pattern A and the amount of fuel contributing to the formation of the heat generation rate pattern B respectively become smaller and the amount of fuel ignited at the same timing becomes dispersed. As a result, as shown in FIG. 7, the peak value of the actual combustion waveform of the heat generation rate pattern C and the slope in the initial stage of combustion (region shown by hatching in FIG. 7) as well become smaller than the peak value and the slope at the initial stage of combustion of the heat generation rate pattern D.

In this way, by providing a time difference and making the fuel burn by compression ignition in stages, it is possible to reduce the combustion noise. Thus, in the present embodiment, when the operating mode is the CI operating mode, ozone of the target ozone feed amount corresponding to the engine operating state is fed to the inside of the combustion chamber 11 so that a time difference is provided and fuel is burned in stages by compression ignition.

In this regard, if a malfunction of the ozone feed system (abnormality or deterioration) causes the actual ozone feed amount (below, referred to as the "actual ozone feed amount") and the target ozone feed amount corresponding to the engine operating state to end up deviating from each other more, the combustion noise is liable to increase or the exhaust emission is liable to deteriorate compared with when the ozone feed system is normal. Below, referring to FIG. 8, this reason will be explained.

Figure 8:
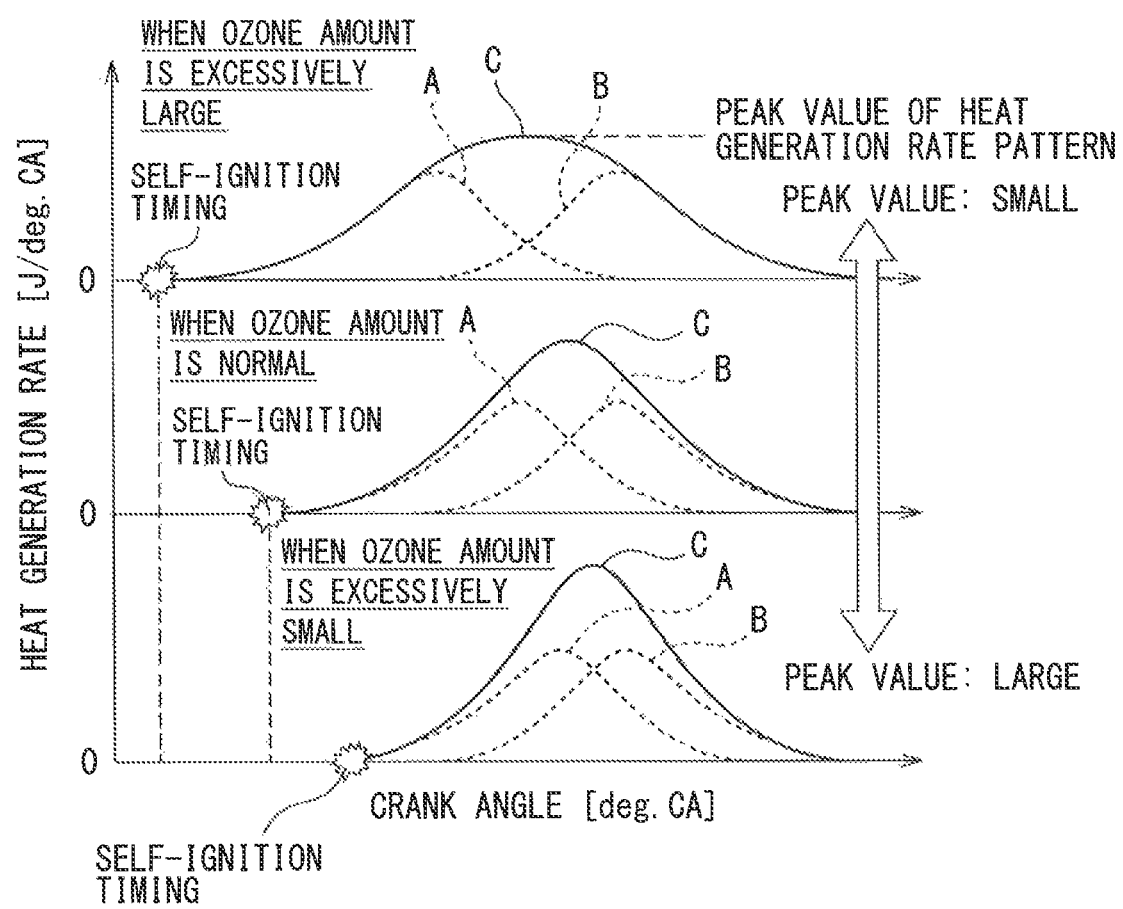
FIG. 8 is a view showing one example of the heat generation rate patterns when the amount of ozone is normal, when the amount of ozone is excessively small and when the amount of ozone is excessively large.

FIG. 8 is a view showing by comparison the heat generation rate pattern when the ozone feed system is normal (when the amount of ozone is normal), the heat generation rate pattern when the ozone feed system is malfunctioning and the actual ozone feed amount becomes smaller than the target ozone feed amount (when the amount of ozone is excessively small), and the heat generation rate pattern when the ozone feed system is malfunctioning and the actual, ozone feed amount becomes larger than the target ozone feed amount (when the amount of ozone is excessively large).

In FIG. 8 as well, in the same way as in FIG. 7, the heat generation rate pattern A is the heat generation rate pattern when the premixed gas present in the high ozone concentration region is burned, by compression ignition. The heat generation rate pattern B is the heat generation rate pattern when the premixed gas present in the low ozone concentration region is burned by compression ignition. The heat generation rate pattern C is the actual heat generation rate pattern combining the heat generation rate pattern A and the heat generation rate pattern B.

It the ozone feed system is malfunctioning and the actual ozone feed amount becomes smaller than the target ozone feed, amount, the ozone concentration in the high ozone concentration region becomes lower than the usual level. For this reason, the self-ignition timing of the premixed gas present in the high ozone concentration region becomes retarded from the usual level. On the other hand, the ozone concentration in the low ozone concentration region fluctuates somewhat compared with the usual level, but the extent of fluctuation is small. For this reason, the self-ignition timing of the premixed gas present in the low ozone concentration region is affected somewhat along with retardation of the heat generation rate pattern A, but does not change much at all compared with the usual level.

As a result, as shown in the "when ozone amount is excessively small" of FIG. 8, the heat generation rate pattern A when the premixed gas present in the high ozone concentration region burns by compression ignition is retarded overall. On the other hand, the heat generation rate pattern B when the premixed gas present in the low ozone concentration region burns by compression ignition does not change much at all.

If in this way the ozone feed system is malfunctioning and the actual ozone feed amount becomes smaller than the target ozone feed amount and the space-wise difference in ozone concentration in the combustion chamber 11 becomes smaller, it becomes difficult to provide a time difference between the self-ignition timing of the premixed gas present in the high ozone concentration region and the self-ignition timing of the premixed gas present in the low ozone concentration region.

That is, if the ozone feed system is malfunctioning and the actual ozone feed amount becomes smaller than the target ozone feed amount, the interval between the self-ignition timing of the premixed gas present in the high ozone concentration region and the self-ignition timing of the premixed gas present in the low ozone concentration region ends up becoming shorter than the usual level. That is, the interval from the crank angle when the heat generation rate pattern A becomes the peak value to the crank angle when the heat generation rate pattern B becomes the peak value becomes narrower than the usual level. For this reason, as shown in "when ozone amount is excessively small" of FIG. 8, the peak value of the actual heat generation rate pattern C combining the heat generation rate pattern A and the heat generation rate pattern B increases from the usual level. As a result, the combustion noise increases compared with when the ozone feed system is normal.

Further, if the ozone feed system is malfunctioning and the actual ozone feed amount becomes larger than the target ozone feed amount, the ozone concentration of the high ozone concentration region becomes higher than the usual level. For this reason, the self-ignition timing of the premixed gas present in the high ozone concentration region advances from the usual level. On the other hand, the ozone concentration in the low ozone concentration region fluctuates somewhat compared with the usual level, but the extent of fluctuation is small. For this reason, the self-ignition timing of the premixed gas present in the low ozone concentration region is affected, somewhat along with advance of the heat generation rate pattern A, but does not change much at all compared with the usual level.

As a result, as shown in "when ozone amount is excessively large" of FIG. 8, the heat generation rate pattern A when the premixed gas present in the high ozone concentration region burns by compression ignition advances overall. On the other hand, the heat generation rate pattern B when the premixed gas present in the low ozone concentration region burns by compression ignition does not change much at all.

If in this way the ozone feed system is malfunctioning and the actual ozone feed amount becomes larger than the target ozone feed amount and the space-wise difference in ozone concentration in the combustion chamber 11 becomes greater than the usual level, the interval between the self-ignition timing of the premixed gas present in the high ozone concentration region and the self-ignition timing of the premixed gas present in the low ozone concentration region becomes longer than the usual level. That is, the interval from the crank angle where the heat generation rate pattern A becomes the peak value to the crank angle where the heat generation rate pattern B becomes the peak value becomes greater than the usual level. For this reason, as shown in "when ozone amount is excessively large" of FIG. 8, the peak value of the actual heat generation rate pattern C combining the heat generation rate pattern A and the heat generation rate pattern B falls from the usual level. As a result, the combustion noise falls compared with the case where the ozone feed system is normal.

However, the self-ignition timing of the premixed gas present in the high ozone concentration region becomes advanced from the usual level, so the premixed gas present in the high ozone concentration region burns by self-ignition in the expansion stroke at a crank angle closer to compression top dead center compared with the usual level. That is, the premixed gas present in the high ozone concentration region burns by self-ignition at a crank angle where the cylinder pressure P and cylinder temperature T are higher than the usual level. As a result, the combustion temperature rises and the amount of discharge of NOx increases, so the exhaust emission deteriorates.

Therefore, when the ozone feed system is malfunctioning, it is preferable to detect this malfunction early.

Here, as shown in FIG. 8, when the actual ozone feed amount becomes smaller than the target ozone feed amount (when the amount of ozone is excessively small), the effect of promotion of self-ignition of the premixed gas by ozone falls by that amount, so the self-ignition timing of the premixed gas becomes retarded from the usual level. On the other hand, when the actual ozone feed amount becomes greater than the target ozone feed amount (when the amount of ozone is excessively large), the effect of promotion, of self-ignition of the premixed gas by ozone increases by that amount, so the self-ignition timing of the premixed gas becomes more advanced than the usual level.

For this reason, for example, it may also be considered possible to judge that the ozone feed system is malfunctioning if detecting the actually existing self-ignition timing (below, referred to as the "actual self-ignition timing") and the actual self-ignition timing becomes advanced or retarded by a predetermined crank angle or more compared with the self-ignition timing presumed from the engine operating state (below, referred to as the "presumed self-ignition timing"). That is, it may also be considered possible to judge that the ozone feed system is malfunctioning by detecting deviation of the actual self-ignition timing from the presumed self-ignition timing.

However, for example, if controlling the various control parts so that the intake temperature, actual compression ratio, EGR rate (oxygen concentration), etc. become target values corresponding to the engine operating state, even when the actual values of the intake temperatures etc. deviate from the target values, the actual self-ignition timing and the presumed self-ignition timing deviate from each other.

When making the premixed gas burn by compression ignition, the fuel injected into the combustion chamber 11 undergoes various chemical reactions in stages along with the rise of the cylinder temperature T (K) and cylinder pressure P (MPa) and then self-ignites. At that time, clear heat generation occurs such as shown in FIG. 6 to FIG. 8. For this reason, the time until the fuel injected into the combustion chamber 11 self-ignites (below, referred to as the "ignition delay time")×(sec) is governed by the speed of progression of the chemical reactions of the fuel after fuel is injected into the combustion chamber 11. This speed of progression of the chemical reactions of the fuel changes depending on not only the cylinder temperature T and cylinder pressure P but also the equivalent ratio $\phi$, the octane value ON of the fuel, the ratio of residual gas RES, rate) RES (%), etc.

In other words, the ignition delay time $\tau$ changes depending on the cylinder temperature T, cylinder pressure P, equivalent ratio $\phi$, octane value ON of fuel, ratio of residual gas RES, etc. Specifically, the ignition delay time $\tau$ basically tends to become shorter the higher the cylinder temperature P, become shorter the higher the cylinder pressure P, become shorter the larger the equivalent ratio $\phi$, become shorter the lower the octane value ON, and become shorter the lower the ratio of residual gas RES.

Therefore, for example, if the intake temperature becomes higher than the target intake temperature, the cylinder temperature T becomes higher than presumed, the ignition delay time $\tau$ becomes shorter, and the premixed gas becomes easier to self-ignite, so the self-ignition timing becomes advanced. On the other hand, if the intake temperature becomes lower than the target intake temperature, the cylinder temperature T becomes lower than the presumed one, the ignition delay time $\tau$ becomes longer, and the premixed gas becomes harder to self-ignite, so the self-ignition timing becomes retarded.

Further, if the actual compression ratio becomes higher than the target actual compression ratio, the cylinder temperature T and cylinder pressure P become higher than presumed, the ignition delay time $\tau$ becomes shorter, and the premixed gas more easily self-ignites, so the self-ignition timing becomes advanced. On the other hand, if the actual compression ratio becomes lower than the target actual compression ratio, the cylinder temperature T and cylinder pressure P become lower than, presumed, the ignition delay time $\tau$ becomes longer, and the premixed gas becomes harder to self-ignite, so the self-ignition timing becomes retarded.

Further, if the EGR rate becomes lower than the target EGR rate, the ratio of residual gas RES becomes lower than presumed (in other words, the oxygen concentration becomes higher than presumed), the ignition delay time $\tau$ becomes shorter, and the premixed gas becomes easier to self-ignite, so the self-ignition timing becomes advanced. On the other hand, if the EGR rate becomes higher than the target EGR rate, the ratio of residual gas RES becomes higher than presumed (in other words, the oxygen concentration becomes lower than presumed), the ignition delay time τ becomes longer, and the premixed gas becomes harder to self-ignite, so the self-ignition timing becomes retarded.

In this way, the actual self-ignition timing, for example, changes even when the intake temperature or actual compression ratio, EGR rate, etc. deviate from the target values corresponding to the engine operating state. That is, in addition to when the ozone feed system is malfunctioning, sometimes the actual self-ignition timing and the presumed self-ignition timing deviate from each other in the same way as when the ozone feed system is malfunctioning. Therefore, by just judging deviation of the actual self-ignition timing and the presumed self-ignition timing, it is not possible to sufficiently differentiate between if the ozone feed system is malfunctioning or if some sort of system other than the ozone feed system is malfunctioning and the precision of judgment of malfunction of the ozone feed system falls.

Here, referring to FIG. 8, when as explained above, the ozone feed system is malfunctioning and the actual ozone feed amount becomes smaller than the target ozone feed amount, the self-ignition timing of the premixed gas is retarded from the usual level and the combustion noise increases. On the other hand, when the ozone feed system is malfunctioning and the actual ozone feed amount becomes greater than the target ozone feed amount, the self-ignition timing of the premixed gas advances from the usual level and the combustion noise fails.

As opposed to this, when the intake temperature etc. deviate from the target values, conversely from the case where the ozone feed system has malfunctioned, when the self-ignition timing of the premixed gas becomes retarded from the usual level, the combustion noise falls, while when the self-ignition timing of the premixed gas becomes advanced from the usual level, the combustion noise increases. Below, the reasons will be explained.

First, the reason why the combustion noise falls when the self-ignition timing of the premixed gas becomes retarded from the usual level, conversely from the case where the ozone feed system has malfunctioned, when the intake temperature etc. deviate from the target values will be explained.

As explained above, malfunction of the ozone feed system causes the self-ignition firming of the premixed gas to be retarded more than the usual level and the combustion noise to increase mainly because just the heat generation rate pattern A becomes retarded and the interval between the self-ignition timing of the premixed gas present in the high ozone concentration region and the self-ignition timing of the premixed gas present in the low ozone concentration region becomes shorter than the usual level.

On the other hand, when the intake temperature etc. deviate from the target values, unlike the case where the ozone feed system has malfunctioned, the difference of ozone concentration inside the combustion chamber 11 becomes as the usual level. Therefore, deviation of the intake temperature etc. from the target values does not have a direct effect on the interval between the self-ignition timing of the premixed gas present in the high ozone concentration region and the self-ignition timing of the premixed gas present in the low ozone concentration region.

Further, the intake temperature etc. deviate from the target values and the self-ignition timing of the premixed gas becomes retarded from the usual level because, for example, the cylinder temperature T etc. fail from the usual level and result in an environment where the premixed gas becomes harder to self-ignite from the usual level in the combustion, chamber 11 as a whole.

Therefore, when the intake temperature etc. deviate from the target values and thereby the self-ignition timing of the premixed gas becomes retarded from the usual level, unlike the case where the ozone feed system has malfunctioned, the self-ignition timing of the premixed gas present in the high ozone concentration region and the self-ignition timing of the premixed gas present in the low ozone concentration region respectively become retarded from the usual level. That is, the heat generation rate pattern A and the heat generation rate pattern B respectively become retarded from the usual level and the heat generation rate pattern C becomes retarded overall.

If, in this way, the self-ignition timing of the premixed gas present in the high ozone concentration region and the self-ignition timing of the premixed gas present in the low ozone concentration region respectively end up becoming retarded from the usual level, at a crank angle at the retarded side further from compression top dead center than the usual level in the expansion stroke, that is, a crank angle lower in cylinder pressure P and cylinder temperature T than the usual level, the premixed gas present in the high ozone concentration region and low ozone concentration region burn by self-ignition. For this reason, compared with the case of combustion by self-ignition at a crank angle with a high cylinder pressure P and cylinder temperature T, the combustion becomes more moderate and the combustion speed falls.

As a result, the self-ignition combustion duration (duration where heat generation rate pattern C clearly appears) becomes longer than the usual level. Further, if the amount of fuel contributing to the formation of the heat generation rate pattern C is the same, if the self-ignition combustion duration becomes longer, the heat generation rate pattern C becomes more moderate overall and the peak value also falls.

Therefore, when deviation of the intake temperature etc. from the target value causes the self-ignition timing of the premixed gas to be retarded from the usual level, conversely to the case where the ozone feed, system has malfunctioned, the peak value of the heat generation rate pattern C falls, so the combustion noise falls.

Next, the reason why the combustion noise increases when the self-ignition timing of the premixed gas becomes advanced from the usual level if the intake temperature etc. deviates from the target value conversely to the case where the ozone feed system has malfunctioned will be explained.

As explained above, a malfunction of the ozone feed system causes the self-ignition timing of the premixed gas to become advanced from the usual level and the combustion noise to fall mainly because only the heat generation rate pattern A becomes advanced and the interval between the self-ignition timing of the premixed gas present in the high ozone concentration region and the self-ignition timing of the premixed gas present in the low ozone concentration region becomes longer than the usual level.

On the other hand, the intake temperature etc. deviate from the target values and the self-ignition timing of the premixed gas becomes more advanced from the usual level because, for example, the cylinder temperature T etc. become higher than the usual level and the combustion chamber 11 as a whole becomes an environment more conducive to self-ignition of the premixed gas than the usual level.

Therefore, when the intake temperature etc. deviate from the target values and the self-ignition timing of the premixed gas becomes advanced from the usual level, unlike when the ozone feed system has malfunctioned, the self-ignition timing of the premixed gas present in the high ozone concentration region and the self-ignition timing of the premixed gas present in the low ozone concentration region become more advanced than the usual level. That is, the heat generation rate pattern A and the heat generation rate pattern B become advanced from the usual level and the heat generation rate pattern C becomes advanced overall.

If in this way the self-ignition timing of the premixed gas present in the high ozone concentration region and the self-ignition timing of the premixed gas present, in the low ozone concentration region, end up becoming advanced from the usual level, the premixed gas present in the high ozone concentration region and low ozone concentration region burn by self-ignition at a crank angle at the advanced side near the compression top dead center from the usual level in the expansion stroke, that is, a crank angle higher in cylinder pressure P and cylinder temperature T than the usual level. For this reason, the combustion becomes steeper and the combustion speed increases.

As a result, the self-ignition combustion duration (duration where heat generation rate pattern C clearly appears) becomes shorter than the usual level. Further, if the amount of fuel contributing to formation of the heat generation rate pattern C is the same, if the self-ignition combustion duration becomes shorter, the heat generation rate pattern C becomes steeper overall. The peak value also increases.

Therefore, when deviation of the intake temperature etc. from the target values causes the self-ignition timing of the premixed gas to become advanced from the usual level, conversely to the case where the ozone feed system has malfunctioned, the peak value of the heat generation rate pattern C increases more than the usual level, so the combustion noise increases.

Figure 9:
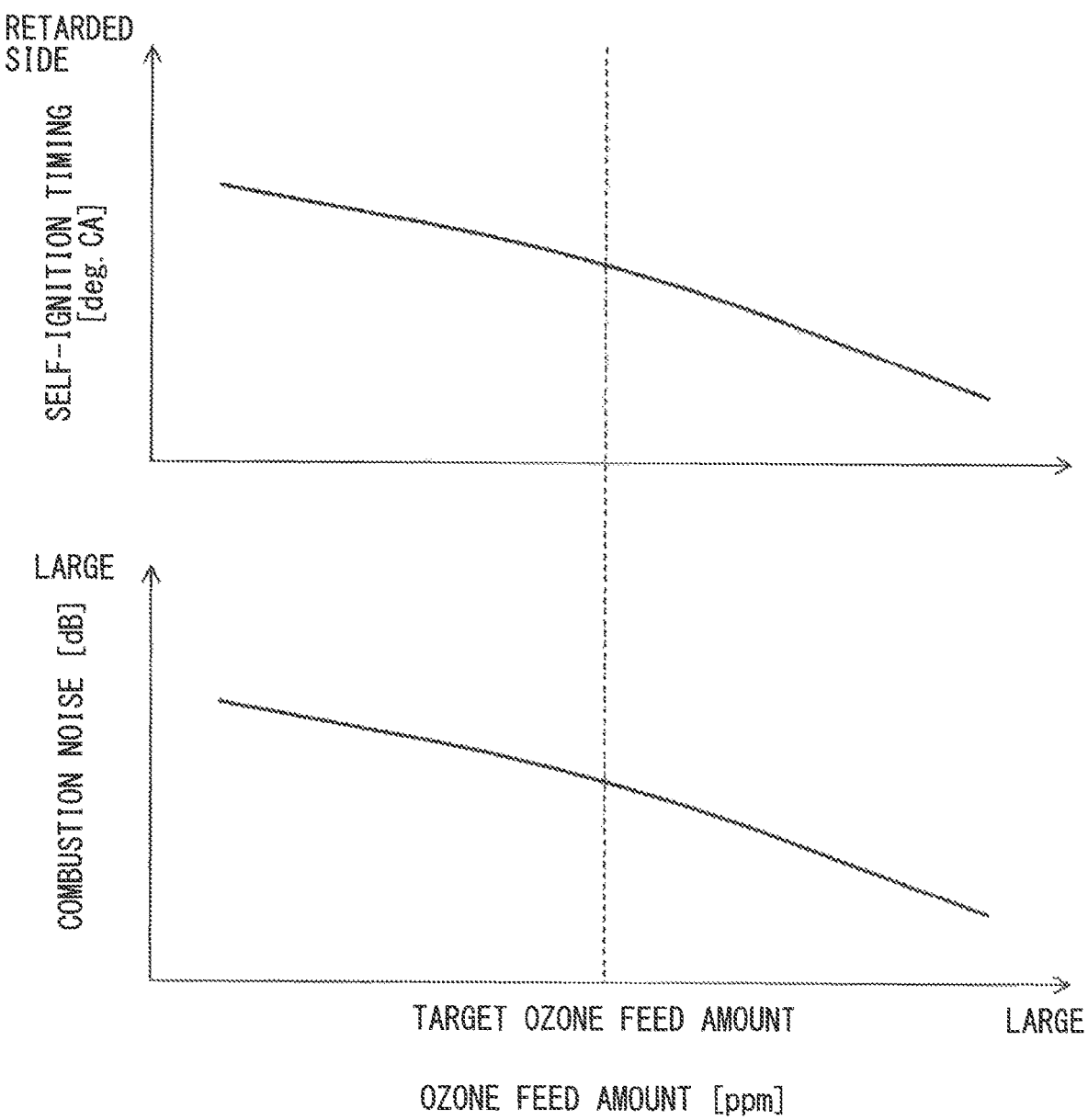
FIG. 9 is a view showing the relationships in a certain engine operating state between an amount of feed of ozone and a self-ignition timing and combustion noise when making premixed gas burn by compression ignition.
Figure 10:
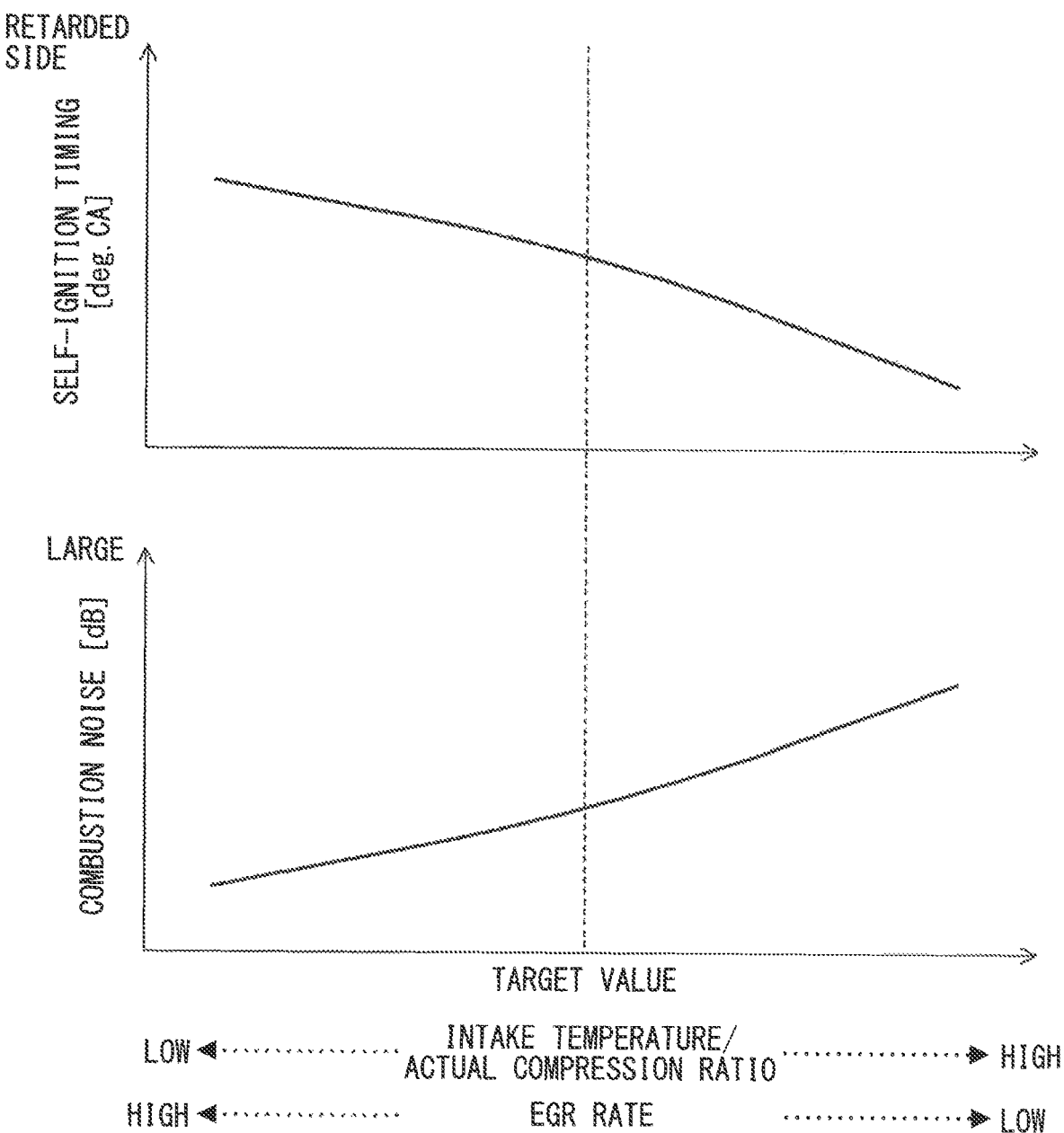
FIG. 10 is a view showing the relationships in a certain engine operating state between an intake temperature, actual compression ratio, and EGR rate and the self-ignition timing and combustion noise when making premixed gas burn by compression ignition.

FIG. 9 is a view showing the relationships in a certain engine operating state between the ozone feed amount and the self-ignition timing and combustion noise when making the premixed gas burn by compression ignition. FIG. 10 is a view showing the relationships in a certain engine operating state between the intake temperature, actual compression ratio and EGR rate (oxygen concentration) and the self-ignition timing and combustion noise when making the premixed gas burn by compression ignition.

As shown in FIG. 9, it is learned that the greater the ozone feed amount from the target ozone feed amount in a certain engine operating state, the more advanced the self-ignition timing and the more the combustion noise falls. Further, it is learned that the smaller the ozone feed amount from the target ozone feed amount in a certain engine operating state, the more retarded the self-ignition timing and the more the combustion noise increases.

On the other hand, as shown in FIG. 10, it is learned that the higher the intake temperature from a target value sit a certain engine operating state, the more advanced the self-ignition timing and the more the combustion noise increases. Further, it is learned that the lower the intake temperature from the target value in a certain engine operating state, the more retarded the self-ignition timing and the more the combustion noise falls.

Further, as shown, in FIG. 10, it is learned that the higher the compression ratio from the target value in a certain engine operating state, the more the self-ignition timing becomes advanced and the more the combustion noise increases. Further, it is learned that the lower the compression ratio from the target value in a certain engine operating state, the more the self-ignition timing is retarded and the more the combustion noise falls.

Further, as shown in FIG. 10, it is learned that the lower the EGR rate from the target value in a certain engine operating state, the more the self-ignition timing becomes advanced and the more the combustion noise increases. Further, it is learned that the higher the EGR rate than a target value in a certain engine operating state, the more the self-ignition timing becomes retarded and the more the combustion noise falls.

In this way, when the ozone feed system is malfunctioning and when the intake temperature etc. deviate from the target values, the trends in change of the combustion noise become completely opposite.

Thus, in the present embodiment, when the actual self-ignition timing and presumed self-ignition timing are separated from each other by a predetermined crank angle Tth or more in the CI operating mode, the actual value of a parameter correlated with the combustion noise (in the present embodiment, the knock strength) and the presumed value of that parameter corresponding to the engine operating state are compared to judge if the ozone feed system is malfunctioning. Below, the control for judging malfunction of the ozone feed system during the CI operating mode according to the present embodiment will be explained.

Figure 11:
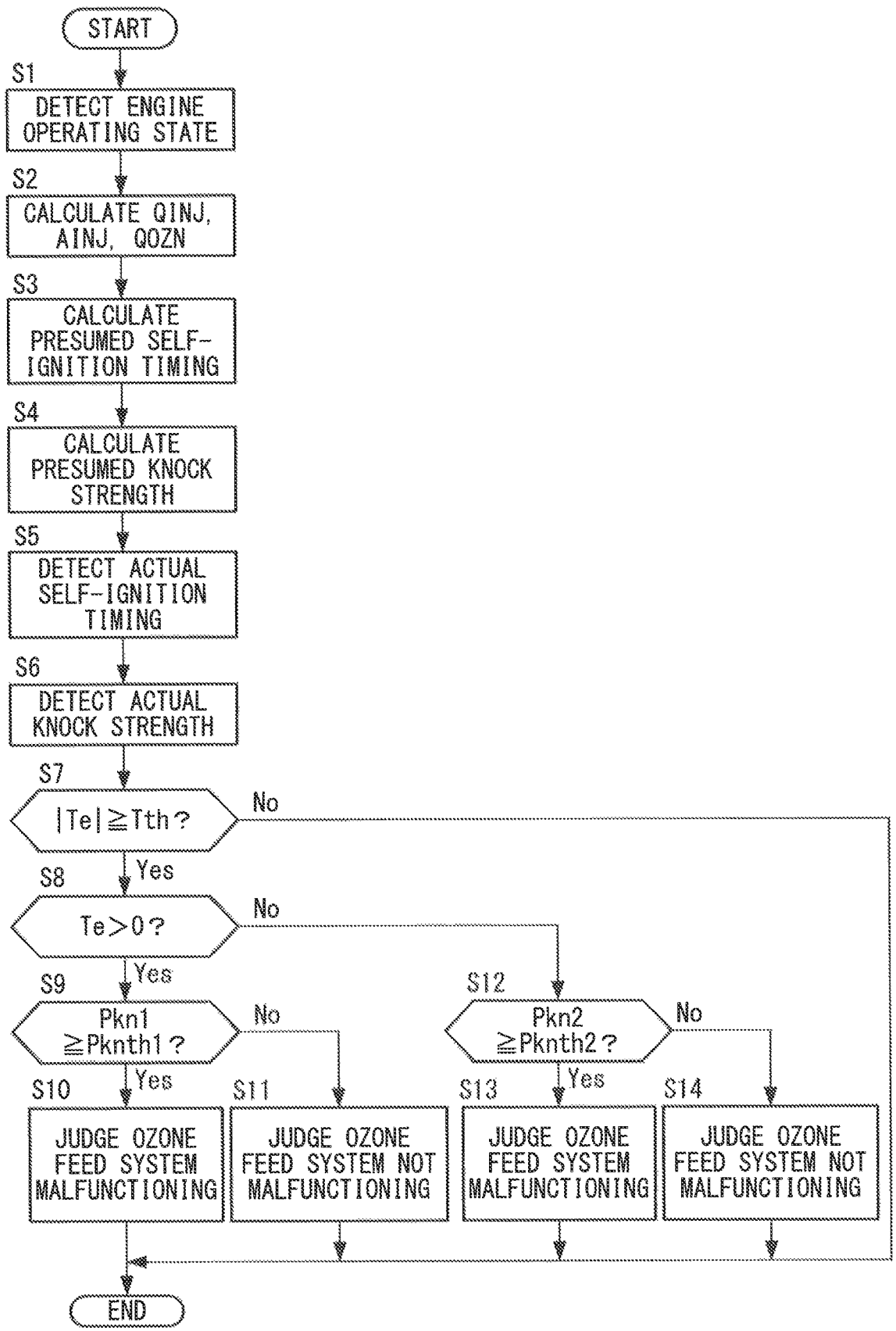
FIG. 11 is flow chart explaining control for judging malfunction of the ozone feed system in a CI operating mode according to a first embodiment of the present disclosure.

FIG. 11 is a flow chart for explaining control for judging malfunction of the ozone feed system in the CI operating mode according to the present embodiment. The electronic control unit 200 repeatedly performs this routine during the CI operating mode by a predetermined processing period (for example 10 ms).

At step S1, the electronic control unit 200 reads the engine speed calculated based on the output signal of the crank angle sensor 218 and the engine load detected by the load sensor 217 and detects the engine operating state.

At step S2, the electronic control unit 200 refers to a table prepared in advance by experiments etc. and calculates the target fuel injection amount QINJ based on the engine load. The target fuel injection amount QINJ basically tends to become greater the higher the engine load.

Further, the electronic control unit 200 refers to a map prepared in advance by experiments etc. and calculates the target injection timing AINJ based on the engine operating state. The target injection timing AINJ is set to a crank angle where the self-ignition, timing of the premixed gas becomes the optimal self-ignition timing (self-ignition timing giving largest output torque).

Further, the electronic control unit 200 refers to a table prepared in advance by experiments etc. and calculates the target ozone teed amount QOZN based on the engine load. The target ozone feed amount QOZN basically tends to become greater the higher the engine load.

Note that the electronic control unit 200 calculates not only the target values of the target fuel injection amount QTNJ etc., but also, separate from this flow chart, the target intake temperature, target intake pressure, target intake valve closing timing, and other such target valve timings etc. of the intake and exhaust valves based on the engine operating state and controls the various types of control parts so that they become the calculated target values.

At step S3, the electronic control unit 200 calculates the presumed self-ignition timing (° CA) of the premixed gas.

Specifically, the electronic control unit 200 first estimates the cylinder pressure P and cylinder temperature T, that is, the initial cylinder state, at the target intake valve closing timing. In the present embodiment, the electronic control unit 200 uses a model for estimation of the initial cylinder state to estimate the initial cylinder state. The model for estimation of the initial cylinder state is a physical processing model using the intake amount, intake temperature, intake pressure, engine cooling water temperature, and other parameters having an effect on the cylinder state as input values and estimating the cylinder pressure P and cylinder temperature T in the target intake valve closing timing.

Next, the electronic control unit 200 calculates the trends in the cylinder pressure P and cylinder temperature T from the target injection timing AINJ of the fuel in the case of burning the premixed gas by compression ignition. In the present embodiment, the electronic control unit 200 first uses the trend model of the cylinder state to estimate the trends in the cylinder pressure P and cylinder temperature T from the intake valve closing timing. The trend model of the cylinder state is a physical processing model for estimating how the cylinder state changes from the initial cylinder state. Using the cylinder pressure F and cylinder temperature T at the target intake valve closing timing as the input values and assuming that the cylinder pressure F and cylinder temperature T during the compression stroke changes polytropically, the trends in the cylinder pressure P and cylinder temperature T from the target intake valve closing timing are estimated.

Further, the electronic control unit 200 uses the trends of the cylinder pressure P and cylinder temperature T from the target injection timing AINJ of the fuel in the case of burning the premixed gas by compression ignition to calculate the presumed self-ignition timing (deg.CA) of the premixed gas from the following equation (1) based on the Livengood-Wu integral equation:

$$\int \left(\frac{1}{\tau}\right)_{P,T} dt = \int_0^{\tau e} A\phi^\alpha P^\beta ON^\gamma \exp(\delta \cdot RES)\exp\left(-\frac{E}{RT}\right) dt \quad (1)$$

In equation (1), $\tau$ is the ignition delay time, P is the cylinder pressure, T is the cylinder temperature, $\phi$ is the equivalent ratio, ON is the octane value, RES is the ratio of residual gas (EGR rate), E is the activation energy, and R is the general gas constant. A, $\alpha$, $\beta$, $\gamma$, and $\delta$ (A, $\alpha$, $\beta$, $\delta$>0, $\gamma$<0) are respectively identification constants.

In equation (1), when time integrating the reciprocal (1/$\tau$) of the ignition delay time from when injecting fuel, the time te when the integral value becomes 1 becomes the ignition delay time $\tau$. Therefore, when time integrating the reciprocal (1/$\tau$) of the ignition delay time at the cylinder pressure P and cylinder temperature T from the target injection timing AINJ, the timing when adding the amount oi crank angle corresponding to the time te when the integral value becomes 1 to the target injection timing AINJ becomes the presumed self-ignition timing of the premixed gas. Note, when using equation (1) to calculate the presumed self-ignition timing of the premixed gas, the effect of the ozone on the self-ignition timing can be reflected in the presumed self-ignition timing by changing the value of the octane value ON of for example equation (1) according to the ozone feed amount. Thus, in the present embodiment, the value of the octane value is set and made to fluctuate corresponding to the target ozone feed amount QOZN.

At step S4, the electronic control unit 200 refers to a table prepared in advance by experiments etc. to calculate the presumed value of the knock strength (below, referred to as the "presumed knock strength") based on the engine operating state.

Figure 12:
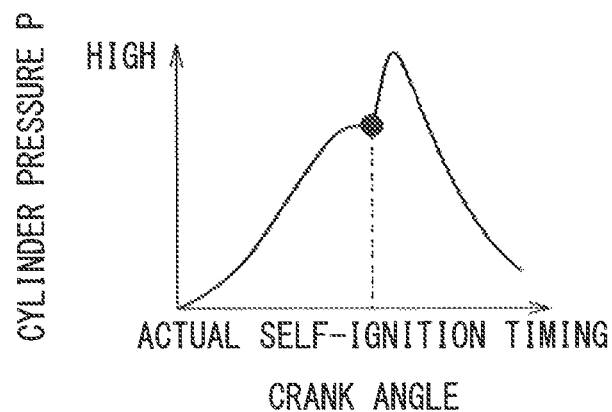
FIG. 12 is a view explaining a method of detecting the actual self-ignition timing based on the cylinder pressure P.

At step S5, the electronic control unit 200 detects the actual self-ignition timing ° CA of the premixed gas. In the present embodiment, the electronic control unit 200 detects the actual self-ignition timing based on the cylinder pressure P detected at the cylinder pressure sensor 219. Specifically, the electronic control unit 200, as shown in FIG. 12, detects the crank angle where the cylinder pressure F sharply rises, that is, the crank angle where the rate of rise of the cylinder pressure P (amount of rise of cylinder pressure P per unit crank angle) becomes a predetermined value or more as the actual self-ignition timing.

Figure 13:
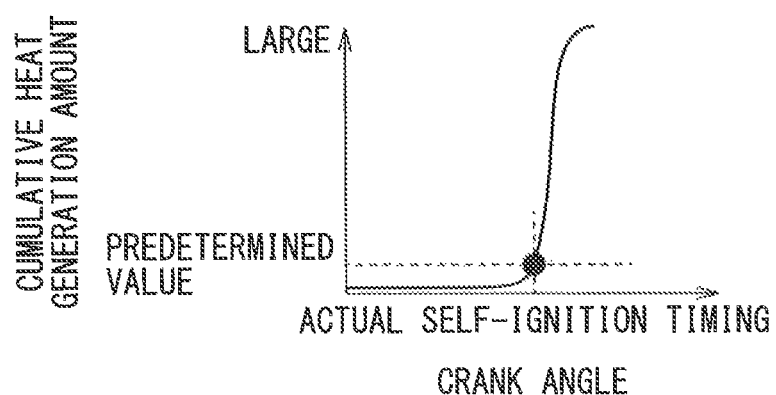
FIG. 13 is a view explaining the method of detecting the actual self-ignition timing based on the cumulative amount of heat generation.
Figure 14:
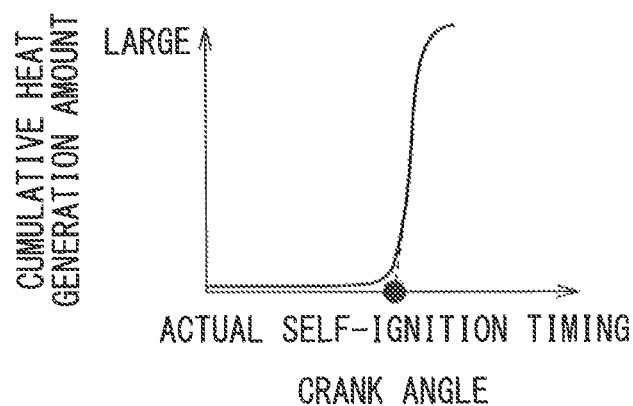
FIG. 14 is a view explaining another method of detecting the actual self-ignition timing based on the cumulative amount of heat generation.

Note, the method of detection of the actual self-ignition timing is not limited to such a method. It is known that it is possible to calculate the heat generation rate (=amount of heat generated per unit crank angle) based on the cylinder pressure P detected by the cylinder pressure sensor 219 and calculate the cumulative value of the amount of heat generation (cumulative amount of heat generation) based on that heat generation rate. Therefore, for example, as shown in FIG. 13, the crank angle where the cumulative value of the amount of heat generation calculated based on the cylinder pressure P becomes a predetermined value or more may be detected as the actual self-ignition timing. Further, as shown in FIG. 14, the crank angle calculated from the slope of the cumulative amount of heat generation by extrapolation may be detected as the actual self-ignition timing.

At step S6, the electronic control unit 200 detects the actual value of the knock signal (below referred to as the "actual knock strength") based on the detected value of the knock sensor 220.

At step S7, the electronic control unit 200 judges if the absolute value of the subtracted value Te of the actual self-ignition timing minus the presumed self-ignition timing is a predetermined value Tth or more. That is, it judges if the actual self-ignition timing and the presumed self-ignition timing have deviated by the predetermined value (predetermined crank angle) Tth or more. The electronic control unit 200 proceeds to the processing of step S8 if the absolute value of the subtracted value Te is the predetermined value Tth or more. On the other hand, the electronic control unit 200 judges that the ozone feed system and other systems are not malfunctioning and ends the current processing if the absolute value of the subtracted value Te is less than the predetermined value Tth.

At step S8, the electronic control unit 200 judges if the actual self-ignition timing is retarded from the presumed self-ignition timing. Specifically, the electronic control, unit 200 judges that the actual self-ignition timing is retarded from the presumed self-ignition timing if the subtracted value Te of the actual self-ignition timing minus the presumed self-ignition timing is a positive value. On the other hand, the electronic control unit 200 judges that the actual self-ignition timing has advanced from the presumed self-ignition timing if the subtracted value Te is a negative value. The electronic control unit 200 proceeds to the processing of step S9 when the actual self-ignition timing is retarded from the presumed self-ignition timing. On the other hand, the electronic control unit 200 proceeds to the processing of step 312 when the actual self-ignition timing is advanced from the presumed self-ignition timing.

At step S9, the electronic control unit 200 judges if the combustion noise is increasing compared with when the ozone feed system is normal. Specifically, the electronic control unit 200 judges that the combustion noise is increasing compared with when the ozone feed system is normal if the subtracted value Pkn1 of the actual knock strength minus the presumed knock strength is a predetermined value Pknth1 or more. The electronic control unit 200 proceeds to the processing of step S10 if the combustion noise is increasing compared with the case where the ozone feed system is normal while proceeds to the processing of step S11 if not increasing.

At step S10, the electronic control unit 200 judges that the ozone feed system is malfunctioning since the self-ignition timing is retarded from the usual level and the combustion noise is increased from the usual level. More specifically, it judges that a malfunction where the actual ozone feed amount becomes smaller than the target ozone feed amount is occurring in the ozone feed system. Note when judging that the ozone feed system is malfunctioning, for example, it is preferable to turn on a malfunction indication lamp (MIL) to prompt the driver to repair the fuel feed system 2.

At step S11, the electronic control unit 200 judges that the ozone feed system is not malfunctioning since although the self-ignition timing is retarded from the usual level, the combustion noise is not increasing from the usual level. Note that if the routine proceeds to the processing of step S11, it is preferable to suitably judge malfunction of another system.

At step S12, the electronic control unit 200 judges if the combustion noise is falling compared with the case where the ozone feed system is normal. Specifically, the electronic control unit 200 judges that the combustion noise is failing compared with the case where the ozone feed system is normal if the subtracted value Pkn2 comprised of the presumed knock strength minus the actual knock strength is a predetermined value Pknth2 or more. The electronic control unit 200 proceeds to the processing of step S13 if the combustion noise is falling compared with the case where the ozone feed system is normal and proceeds to the processing of step S14 if the combustion noise is not failing compared with the usual level.

At step S13, the electronic control unit 200 judges that the ozone feed system is malfunctioning since the self-ignition timing is advanced from the usual level and the combustion noise is failing from the usual level. More particularly, it judges that a malfunction resulting in the actual ozone feed amount becoming greater than the target ozone feed amount has occurred in the ozone feed system.

At step S14, the electronic control unit 200 judges that the ozone feed system is not malfunctioning although the self-ignition timing is advanced from the usual level, since the combustion noise does not fall from the usual level. Note that when the routine proceeds to the processing of step S14, it is preferable to suitably judge malfunction of other systems.

According to the present embodiment explained above, there is provided an electronic control unit 200 (control device) controlling an internal combustion engine 100 comprising an engine body 1, a fuel feed system 2 configured to directly feed fuel into a combustion chamber 11 of the engine body 1, and a discharge plug 81 serving as an ozone feed system configured to directly or indirectly feed ozone into the combustion chamber 11. The electronic control unit 200 comprises a combustion control part configured to control the fuel feed system 2 and ozone feed system, in the self-ignition region RR (predetermined operating region) so as to form a difference in ozone concentration space-wise or time-wise in the combustion chamber 11 and thereby make the premixed gas burn by compression ignition in stages in the combustion chamber 11 and an ozone malfunction judging part configured to judge a malfunction of the ozone feed system in the self-ignition region RR (predetermined operating region).

Further, the ozone malfunction judging part comprises an actual self-ignition timing detecting part configured to detect an actual self-ignition timing of the premixed gas, a presumed self-ignition timing calculating part configured to calculate a presumed self-ignition timing of the premixed gas, a combustion noise detecting part configured to detect combustion noise when making the premixed gas burn by compression ignition, and a presumed combustion noise calculating part configured to calculate presumed combustion, noise when making the premixed gas burn by compression ignition. The ozone malfunction judging part is configured so as to judge that the ozone feed systems is malfunctioning when the actual self-ignition timing is retarded from the presumed self-ignition timing and the combustion noise is larger than the presumed combustion noise or the actual self-ignition timing is advanced from the presumed self-ignition timing and the combustion noise is smaller than the presumed combustion noise.

Due to this, it is possible to judge if the ozone feed system is malfunctioning and the actual self-ignition timing and the presumed self-ignition timing deviate or if the intake temperature or actual compression ratio, EGR rate, etc. deviate from the target values corresponding to the engine operating state and thereby the actual self-ignition timing and presumed self-ignition timing deviate from each other. For this reason, it is possible to suppress a drop in the precision of judgment of malfunction of the ozone feed system.

Second Embodiment

Next, a second embodiment or the present disclosure will be explained. The present embodiment differs from the first embodiment in the content of the control for judging malfunction of the ozone feed system during the CI operating mode. Below, the points of difference will be focused on for the explanation.

Figure 15:
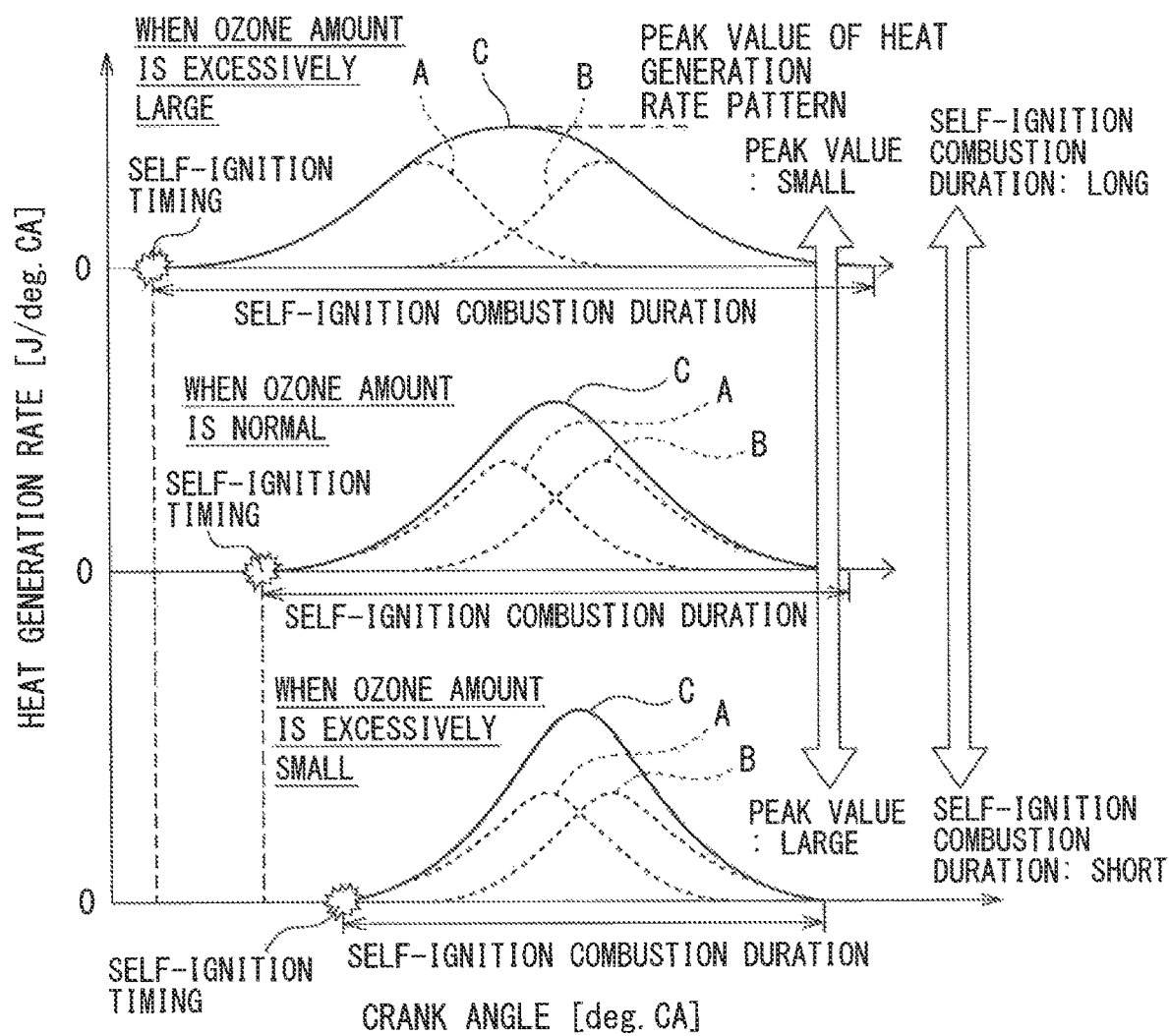
FIG. 15 is a view showing one example of the heat generation rate patterns when the amount of ozone is normal when the amount of ozone is excessively small, and when the amount of ozone is excessively large.

FIG. 15, like FIG. 8, is a view showing by comparison the heat generation rate pattern when the ozone feed system is normal (when the amount of ozone is normal), the heat generation rate pattern when the ozone feed system is malfunctioning and the actual ozone feed amount becomes smaller than the target ozone feed, (when the amount of ozone is excessively small), and the heat generation rate pattern when the ozone feed system is malfunctioning and the actual ozone feed amount becomes larger than the target ozone feed (when the amount of ozone is excessively large).

In FIG. 15 as well, in the same way as FIG. 7 and FIG. 8, the heat generation rate pattern A is a heat generation rate pattern when the premixed gas present in the high ozone concentration region burns by compression ignition. The heat, generation rate pattern B is a heat generation rate pattern when the premixed gas in the low ozone concentration region burns by compression ignition. The heat generation rate pattern C is the actual heat generation rate pattern combining the heat generation rate pattern A and the heat generation rate pattern B.

While explained also referring to FIG. 8, as shown in "when ozone amount is excessively small" of FIG. 15, when the ozone reed system is malfunctioning and the actual ozone feed amount becomes smaller than the target ozone feed amount, the self-ignition timing of the premixed gas becomes retarded from the usual level and the combustion noise increases. Further, as shown in the "when ozone amount is excessively large" of FIG. 15, when, the ozone feed system is malfunctioning and the actual ozone feed amount becomes larger than the target ozone feed amount, the self-ignition timing of the premixed gas becomes more advanced than the usual level and the combustion noise falls.

Further, as will be understood from FIG. 15 as well, when the amount of ozone is excessively small, the heat generation rate pattern A becomes retarded overall, while the heat generation rate pattern B does not move much at all. For this reason, when the ozone feed system is malfunctioning and the self-ignition timing of the premixed gas is retarded from the usual level, the self-ignition combustion duration shown in FIG. 15 (duration when heat generation rate pattern C clearly appears) becomes shorter than the usual level. Further, when the amount of ozone is excessively large, the heat generation rate pattern A becomes advanced overall, while the heat generation rate pattern B does not move much at all. For this reason, when the ozone feed system is malfunctioning and the self-ignition timing of the premixed gas is advanced from the usual level, the self-ignition combustion duration shown in FIG. 15 becomes longer than the usual level.

As opposed to this, when the intake temperature etc. deviates from the target value and thereby the self-ignition timing of the premixed gas is retarded from the usual level, as explained above, the self-ignition combustion duration becomes longer than the usual level. Further, when the intake temperature etc. deviates from the target value and thereby the self-ignition timing of the premixed gas is advanced from the usual level, as explained above, the self-ignition combustion duration becomes shorter than the usual level.

Figure 16:
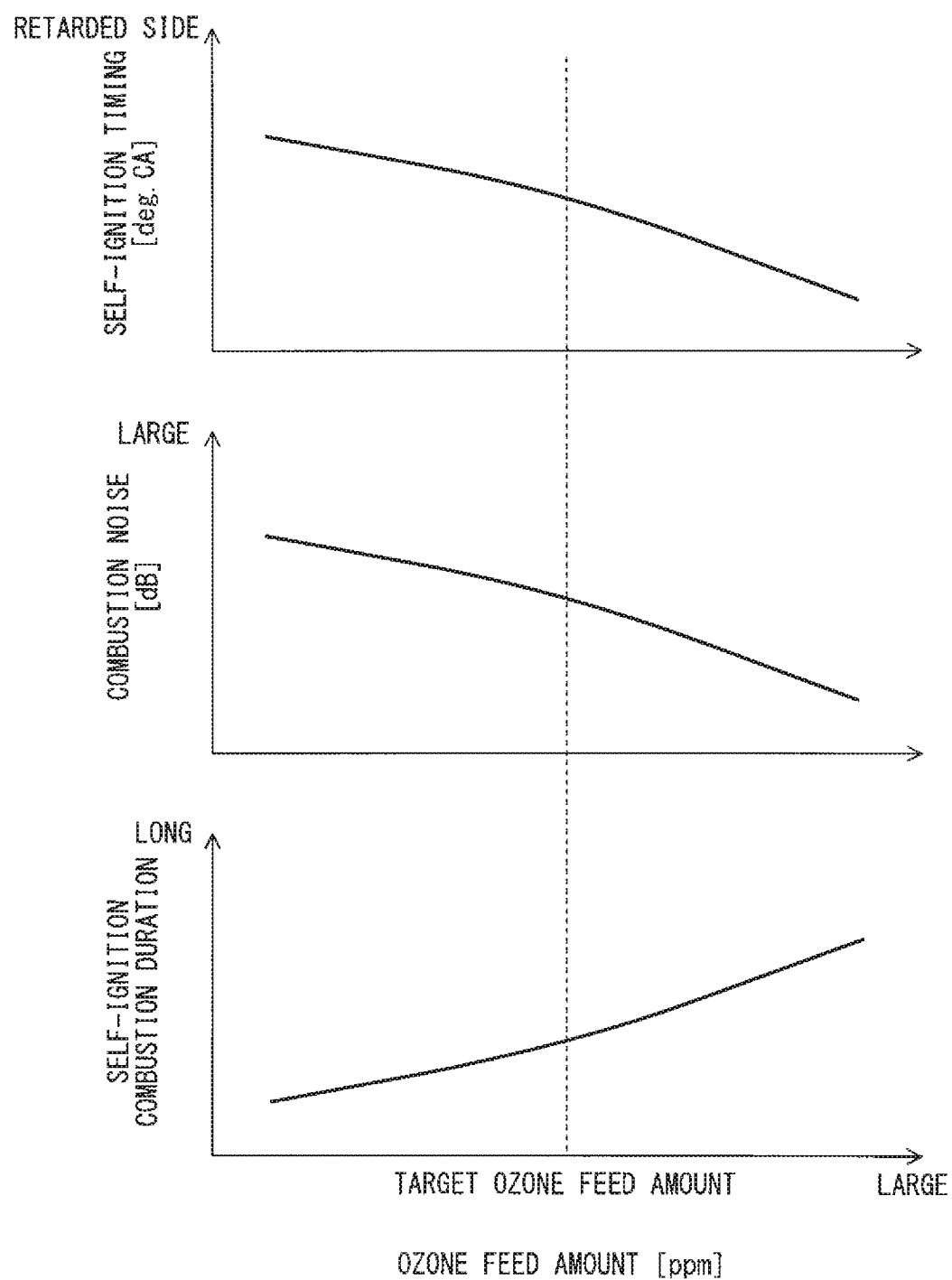
FIG. 16 is a view showing the relationships in a certain engine operating state between an amount of feed of ozone and a self-ignition timing, combustion noise, and self-ignition combustion duration when making the premixed gas burn by compression ignition.
Figure 17:
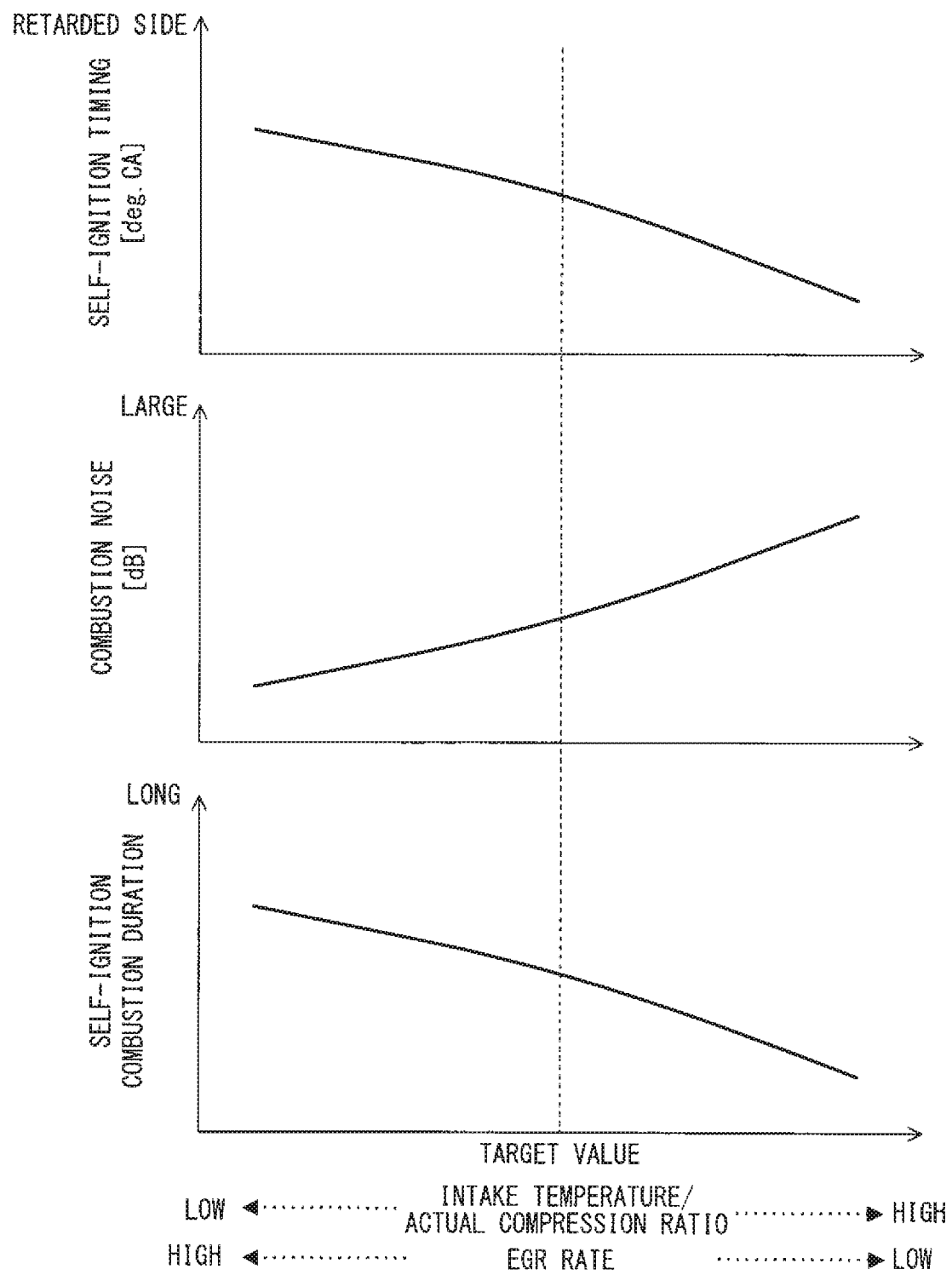
FIG. 17 is a view showing the relationships in a certain engine operating state between an intake temperature, actual compression ratio, and EGR rate and a self-ignition timing, combustion noise, and self-ignition combustion duration when making the premised gas burn by compression ignition.

FIG. 16 is a view showing the relationship between the ozone feed amount in a certain engine operating state and the self-ignition timing, combustion noise, and self-ignition combustion duration when making the premixed gas burn by compression ignition. FIG. 17 is a view showing the relationship between the intake temperature, actual compression ratio, and EGR rate (oxygen concentration) in a certain engine operating state and the self-ignition timing, combustion noise, and self-ignition combustion duration when making the premixed gas burn by compression ignition.

As shown in FIG. 16, it is learned that the greater the ozone feed amount from the target ozone feed amount in a certain engine operating state, the more advanced the self-ignition timing and the longer the self-ignition combustion duration. Further, it is learned that the smaller the ozone feed amount from the target oxygen feed amount in a certain engine operating state, the more retarded the self-ignition timing and the shorter the self-ignition combustion duration.

On the other hand, as shown in FIG. 17, it is learned that the higher the intake temperature from the target value in a certain engine operating state, the more advanced the self-ignition timing and the shorter the self-ignition combustion duration. Further, it is learned that the lower the intake temperature from the target value at a certain engine operating state, the more retarded the self-ignition timing and the longer the self-ignition combustion duration.

Further, as shown in FIG. 17, it is learned that the higher the compression ratio from the target value in a certain engine operating state, the more the self-ignition timing becomes advanced and the shorter the self-ignition combustion duration becomes. Further, the lower the compression ratio from the target value at a certain engine operating state, the more the self-ignition timing becomes retarded and the longer the self-ignition combustion duration becomes.

Further, as shown in FIG. 17, it is learned that the lower the EGR rate from the target value at a certain engine operating state, the more advanced the self-ignition timing and the shorter the self-ignition combustion duration. Further, it is learned that the higher the EGR rate from the target value at a certain engine operating state, the more retarded the self-ignition timing and the longer the self-ignition combustion duration.

In this way, when the ozone feed system is malfunctioning and when the intake temperature etc. deviates from the target value, in the same way as the combustion noise, the trends in change of the self-ignition combustion duration are completely opposite.

Thus, in the present embodiment, when the actual self-ignition timing and the presumed self-ignition timing are separated by a predetermined crank angle Tth or more during the CI operating mode, the actual value of the self-ignition combustion duration and the presumed value of the self-ignition combustion duration are compared and it is judged if the ozone feed system is malfunctioning. Below, the control for judging malfunction of the ozone feed system in this CI operating mode according to the present embodiment will be explained.

Figure 18:
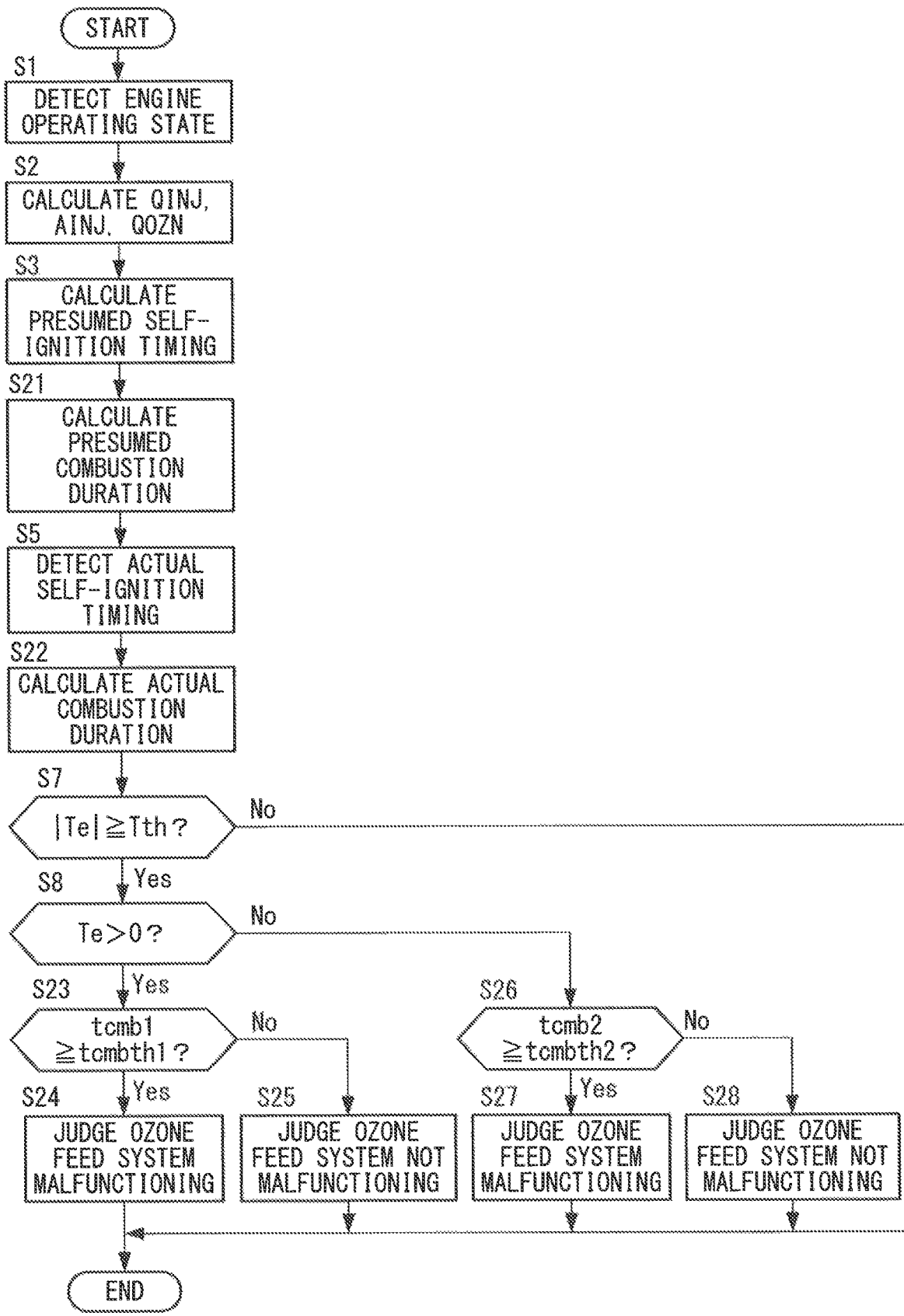
FIG. 18 is a flow chart explaining control for judging malfunction of an ozone feed system in a CI operating mode according to a second embodiment of the present disclosure.

FIG. 18 is a flow chart explaining the control for judging malfunction of the ozone feed system in the CI operating mode according to the present embodiment. The electronic control unit 200 repeatedly performs this routine during the CI operating mode by a predetermined processing period (for example 10 ms). Note, the processing from step S1 to step S3, step S5, step S7, and step S8 performs processing similar in content to the flow chart of FIG. 11, so the explanations will be omitted here.

At step S21, the electronic control unit 200 refers to a map prepared in advance by experiments etc. and calculates the presumed value of the self-ignition combustion duration based on the engine operating state (below, referred to as the "presumed combustion duration").

At step S22, the electronic control unit 200 calculates the actual value of the self-ignition combustion duration (below, referred to as the "actual combustion duration"). In the present embodiment, the electronic control unit 200 calculates the heat generation rate pattern based on the cylinder pressure P detected by the cylinder pressure sensor 219 and calculates the actual combustion duration from the heat generation rate pattern.

At step S23, the electronic control unit 200 judges if the self-ignition combustion duration is becoming shorter compared with when the ozone feed system is normal. Specifically, the electronic control unit 200 judges that the self-ignition combustion duration is becoming shorter compared with when the ozone feed system is normal if the subtracted value tcmb1 of the presumed combustion duration minus the actual combustion duration is the predetermined value tcmbth1 or more. The electronic control unit 200 proceeds to the processing of step S24 if the self-ignition combustion duration becomes shorter compared with when the ozone feed system is normal and proceeds to the processing of step S25 if it does not become shorter.

At step S24, the electronic control unit 200 judges that the ozone feed system is malfunctioning since the self-ignition timing is retarded from the usual level and the self-ignition combustion duration becomes shorter than the usual level. More specifically, it judges that a malfunction where the actual ozone feed amount becomes smaller than the target ozone feed amount is occurring in the ozone feed system.

At step S25, the electronic control unit 200 judges that the ozone feed system is not malfunctioning since while the self-ignition timing is retarded from the usual level, the self-ignition combustion duration does not become shorter than the usual level. Note that when the routine proceeds to the processing of step S25, it is preferable to suitably judge malfunction of another system.

At step S26, the electronic control unit 200 judges if the self-ignition combustion duration has becoming longer compared with when the ozone feed system is normal. Specifically, the electronic control unit 200 judges that the self-ignition combustion duration is becoming longer compared with when the ozone feed system is normal if the subtracted value tcmb2 of the actual combustion duration minus the presumed combustion duration is a predetermined value tcmbth2 or more. The electronic control unit 200 proceeds to the processing of step S27 if the self-ignition combustion duration becomes longer compared with when the ozone feed system is normal and proceeds to the processing of step S28 if it does not fall.

At step S27, the electronic control unit 200 judges that the ozone feed system is malfunctioning since the self-ignition timing is advanced from the usual level and the self-ignition combustion duration is longer than the usual level. More specifically, it judges that a malfunction resulting in the actual ozone feed amount becoming greater than the target ozone feed amount has occurred in the ozone feed, system.

At step S28, the electronic control unit 200 judges that the ozone feed system is not malfunctioning since while the self-ignition timing is advanced from the usual level, the self-ignition combustion duration is not longer than the usual level. Note that if the routine proceeds to the processing or step S28, it is preferable to suitably judge a malfunction of other systems.

According to the present embodiment explained above, there is provided an electronic control unit 200 (control device) controlling an internal combustion engine 100 comprising an engine body 1, a fuel feed system 2 configured to directly feed fuel into a combustion chamber 11 of the engine body 1, and a discharge plug 81 serving as an ozone feed system configured to directly or indirectly feed ozone into the combustion chamber 11. The electronic control unit 200 comprises a combustion control part configured to control the fuel feed system 2 and ozone feed system in the self-ignition region ER (predetermined operating region) so as to form a difference in ozone concentration space-wise or time-wise in the combustion chamber 11 and thereby make the premixed gas burn by compression ignition in stages in the combustion chamber 11 and an ozone malfunction judging part configured to judge a malfunction of the ozone feed system in the self-ignition region RR (predetermined operating region).

Further, the ozone malfunction judging part comprises an actual self-ignition timing detecting part configured to detect an actual self-ignition timing of the premixed gas, a presumed self-ignition timing calculating part configured to calculate a presumed self-ignition timing of the premixed gas, an actual combustion duration detecting part configured to detect an actual combustion duration when making the premixed gas burn by compression ignition, and a presumed combustion duration calculating part configured to calculate a presumed combustion duration when making the premixed gas burn by compression ignition, the ozone malfunction judging part is configured to judge that the ozone feed system is malfunctioning when the actual self-ignition timing is retarded from the presumed self-ignition timing and the actual combustion duration is shorter than the presumed combustion duration or when the actual self-ignition timing is advanced from the presumed self-ignition timing and the actual combustion duration is longer than the presumed combustion duration.

Due to this, it is possible judge if the ozone feed system is malfunctioning and the actual self-ignition timing and presumed self-ignition timing deviate from each other or if the intake temperature, actual compression ratio, EGR rate, etc. deviate from the target values corresponding to the engine operating state and thereby the actual self-ignition timing and presumed self-ignition timing deviate from each other. For this reason, it is possible to suppress a drop in the precision of judgment of malfunction of the ozone feed system.

Third Embodiment

Next, a third embodiment of the present disclosure will be explained. The present embodiment differs from the second embodiment on the point of judging whether to judge malfunction of the ozone feed system based on the result of judgment of malfunction of the fuel feed system 2. Below, this point of difference will be focused on in the explanation.

In the second embodiment, if during the CI operating mode, the actual self-ignition timing and the presumed self-ignition timing become separated by a predetermined crank angle Tth or more, the actual combustion duration and presumed combustion duration were compared and it was judged if the ozone feed system was malfunctioning.

Here, the actual self-ignition timing changes according to the equivalent ratio $\phi$. Specifically, when the fuel injection amount becomes greater than the target fuel injection amount QINJ corresponding to the engine load, the equivalent ratio $\phi$ biomes greater than presumed and the premixed gas becomes easier to self-ignite, so the self-ignition timing becomes advanced. On the other hand, when the fuel injection amount becomes smaller than the target fuel injection amount QINJ, the equivalent ratio $\phi$ becomes smaller than presumed and the premised gas becomes harder to self-ignite, so the self-ignition timing becomes retarded.

That is, even when a malfunction of the fuel feed system 2 causes the fuel injection amount to change according to the target fuel injection amount QINJ corresponding to the engine load, in the same way as the ozone feed system, is malfunctioning, the actual self-ignition timing and the presumed self-ignition timing deviate from each other. Further, if malfunction of the fuel feed system 2 causes the actual self-ignition timing and the presumed self-ignition timing to deviate, in the same way as when the ozone feed system is malfunctioning, sometimes the self-ignition combustion duration becomes shorter than the usual level when the actual ignition timing is retarded from the usual level or the self-ignition combustion duration becomes longer than the usual level when the actual ignition timing is advanced from the usual level. Below, this point will be explained with reference to FIG. 19.

Figure 19:
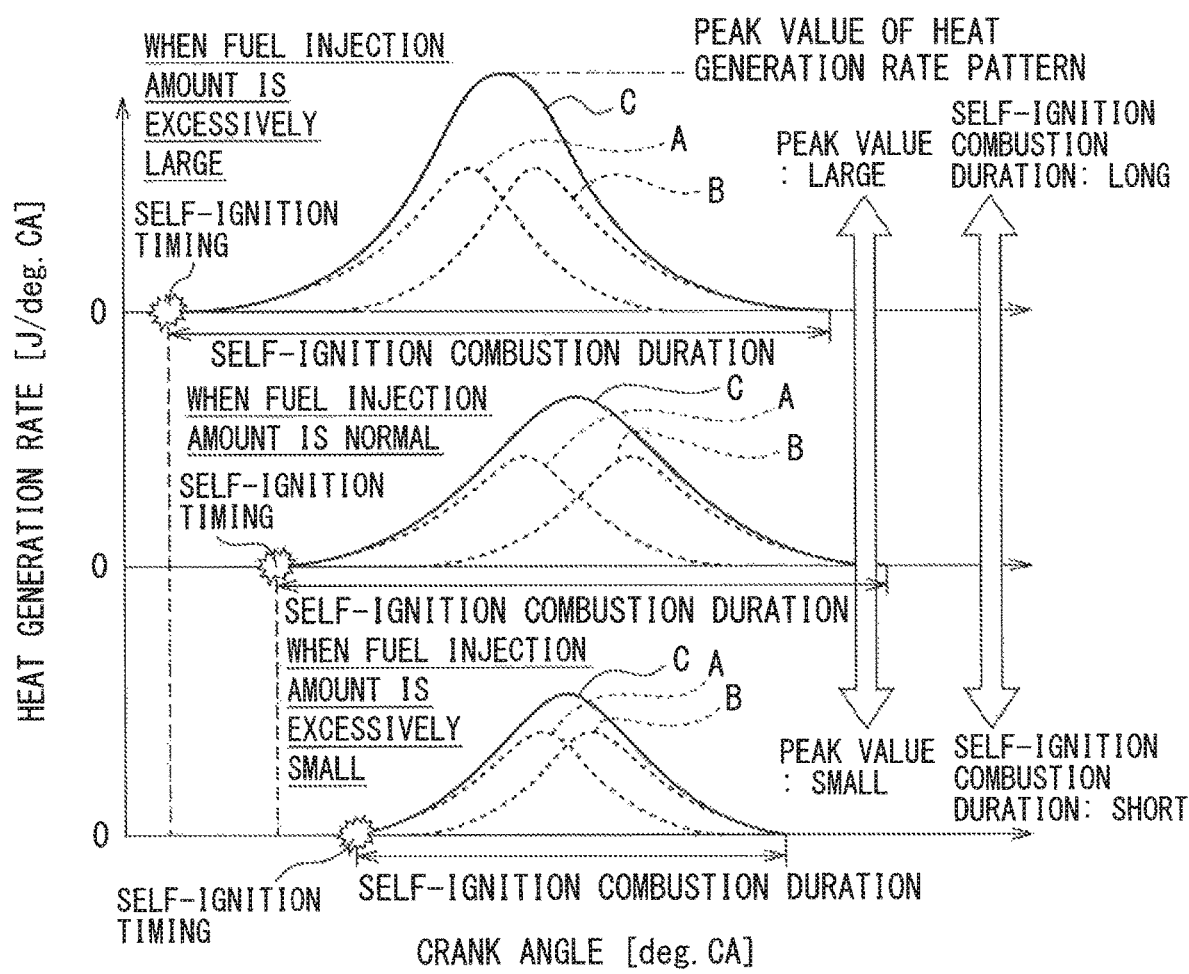

FIG. 19 is a view showing the heat generation rate pattern when the fuel feed system 2 is normal (when the amount of fuel injection, is normal), an example of the heat generation rate pattern when the fuel feed system 2 is malfunctioning and the fuel injection amount becomes smaller than the target injection amount (when the amount of fuel injection is excessively small), and an example of the heat generation rate pattern when the fuel feed system 2 is malfunctioning and the fuel injection amount becomes greater than the target injection amount (when the amount of fuel injection is excessively large).

Note that in FIG. 19, the ozone feed system is normal when the amount of fuel injection is normal, when it is excessively small, and when it is excessively large. Further, in FIG. 19 as well, in the same way as in FIG. 7 etc., the heat generation rate pattern A is the heat generation rate pattern when the premixed gas present in the high ozone concentration region burns by compression ignition. The heat generation rate pattern B is the heat generation rate pattern when the premixed gas in the low ozone concentration region burns by compression ignition. The heat generation rate pattern C is the actual heat generation rate pattern combining the heat generation rate pattern A and the heat generation rate pattern B.

As shown in "when fuel injection amount is excessively small" of FIG. 19, if the fuel injection amount becomes smaller than the target fuel injection amount QINJ, the equivalent ratio φ becomes smaller than presumed and the premixed gas becomes harder to self-ignite, so the self-ignition timing becomes retarded compared with when the amount of fuel injection is normal.

For this reason, the premixed gas burns by self-ignition by a crank angle with a lower cylinder pressure P and cylinder temperature T compared with when the amount of fuel injection is normal, so basically the combustion becomes more moderate and the combustion speed falls.

However, as shown in "when, fuel injection amount is excessively small" of FIG. 19, if the fuel injection amount becomes smaller than the target fuel injection amount QINJ, the amount of fuel itself contributing to formation of the heat generation rate pattern C becomes smaller than when the amount of fuel injection is normal, so even if the combustion becomes more moderate and the combustion speed falls, sometimes the self-ignition combustion duration becomes shorter than when the amount of fuel injection is normal.

Further, as shown in "when fuel injection amount is excessively large" of FIG. 19, if the fuel injection amount becomes greater than the target fuel injection amount QINJ, the equivalent ratio φ becomes larger than presumed and the premixed gas easily self-ignites, so the self-ignition timing advances more than when the amount of fuel injection is normal.

For this reason, the premixed gas self-ignites and burns at a crank angle with a higher cylinder pressure P and cylinder temperature T compared with when the amount of fuel injection is normal, so basically the combustion becomes steeper and the combustion speed increases.

However, as shown in "when fuel injection amount is excessively large" of FIG. 19, if the fuel injection amount becomes greater than the target fuel injection amount QINJ, the amount of fuel itself contributing to formation of the heat generation rate pattern C becomes larger than when the amount of fuel injection is normal, so even if combustion becomes steeper and the combustion speed increases, the self-ignition combustion duration will sometimes become longer than when the amount of fuel injection is normal.

Therefore, when, like in the second embodiment, the actual self-ignition timing and the presumed self-ignition timing are separated by a predetermined crank angle Tth or more, if comparing the actual combustion duration and the presumed combustion duration to judge if the ozone feed system is malfunctioning, if not judging malfunction of the fuel feed system 2 in advance, it is liable to be mistakenly judged that the ozone feed system is malfunctioning regardless of the fuel feed system 2 malfunctioning.

Thus, the present embodiment judges malfunction of the fuel feed system 2 in advance and then judges malfunction of the ozone feed system.

Note that as shown in FIG. 19, the combustion noise (peak value of heat generation rate) decreases from the usual level when the actual self-ignition timing is retarded and increases when it is advanced. That is, when it comes to the combustion noise, the trends in change are completely opposite between the case where the ozone feed system malfunctions and the case where the fuel feed system 2 malfunctions. Therefore, like in the first embodiment, when the actual self-ignition timing and the presumed self-ignition timing are separated by a predetermined crank angle Tth or more, if comparing the actual combustion duration and the presumed combustion duration to judge if the ozone feed system is malfunctioning, even if the ozone feed system has malfunctioned, it is possible to precisely judge malfunction of the ozone feed system.

Figure 20:
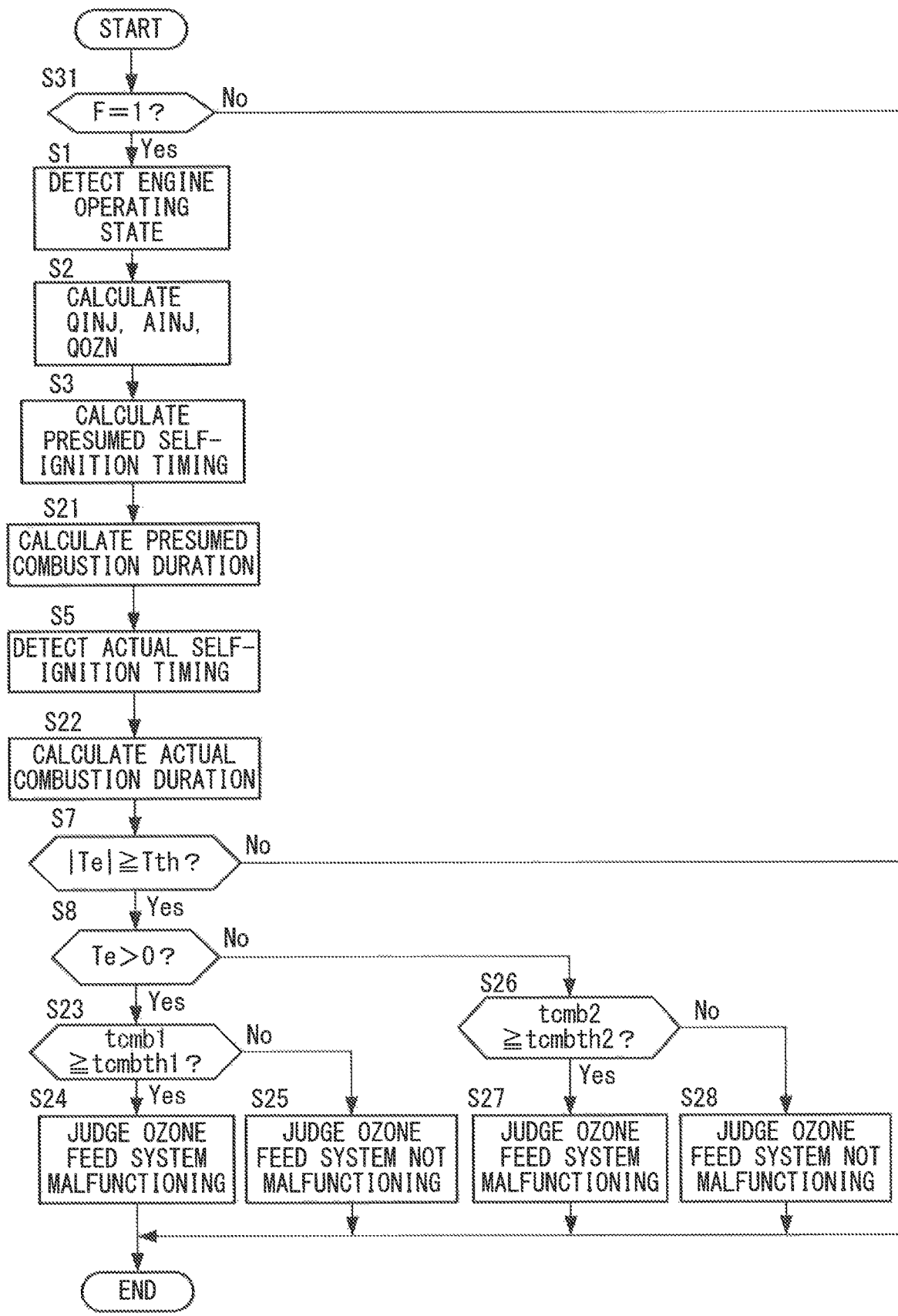
FIG. 20 is a flow chart explaining control for judging malfunction of the ozone teed system in a CI operating mode according to a third embodiment of the present disclosure.

FIG. 20 is a flow chart explaining control for judging malfunction of the ozone feed system in the CI operating mode according to the present embodiment. The electronic control unit 200 repeatedly performs this routine at a predetermined processing period, (for example 10 ms) during the CI operating mode. Note that, other than the processing of step S31, processing similar to the flow chart of FIG. 18 is performed, so the explanation here will be omitted.

At step S31, the electronic control unit 200 judges if the malfunction judgment execution flag F of the ozone feed system has been set to "1". The malfunction judgment execution flag F of the ozone feed system is a flag which is set in value to "0" or "1" in the control for judging malfunction of a fuel feed system explained later referring to FIG. 21 and is set to "0" when it is liable to be mistakenly judged to judge malfunction of the ozone feed system. Note that the initial value of the malfunction judgment execution flag F of the ozone feed system is set to "1".

Figure 21:
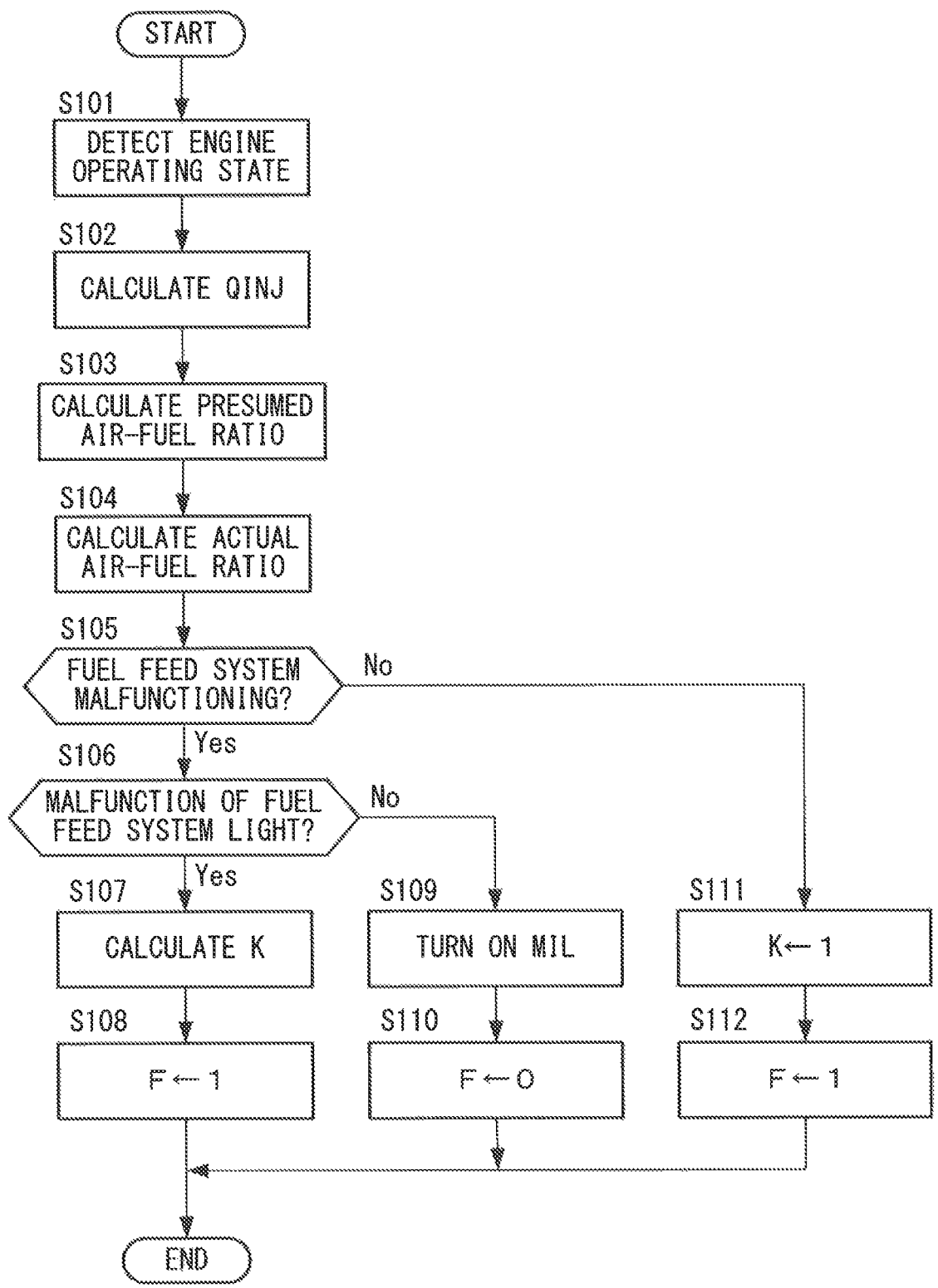
FIG. 21 is a flow chart explaining control for judging malfunction of a fuel feed system according to a third embodiment of the present disclosure.

FIG. 21 is a flow chart explaining the control for judging malfunction of the fuel feed system 2 according to present embodiment. The electronic control unit 200 repeatedly performs the present routine, separate from control for judging malfunction of the ozone feed system, at a predetermined processing period (for example 10 ms).

At step S101, the electronic control unit 200 reads the engine speed calculated based on the output signal of the crank angle sensor 218 and the engine load detected by the load sensor 217 and detects the engine operating state.

At step S102, the electronic control unit 200 refers to a table prepared in advance by experiments etc. and calculates the target fuel injection amount QINJ based on the engine load.

At step S103, the electronic control unit 200 calculates a presumed value of the air-fuel ratio of the exhaust (below, referred to as the "presumed air-fuel ratio") based on the amount of intake detected by the air flow meter 212 and the target fuel injection amount QINJ.

At step S104, the electronic control unit 200 calculates the actual value of the air-fuel ratio (below, referred to as the "actual air-fuel ratio") of the exhaust based on the detected value of the air-fuel ratio sensor 221.

At step S105, the electronic control unit 200 judges if the fuel feed system 2 is malfunctioning. Specifically, the electronic control unit 200 judges if the subtracted value AFR of the absolute value of the actual air-fuel ratio minus the presumed air-fuel ratio (below, referred to as the "air-fuel ratio difference") is the predetermined value AFRth1 or more. The electronic control unit 200 judges that the fuel feed system 2 is malfunctioning and proceeds to the processing of step S106 if the absolute value of the air-fuel ratio difference AFR is the predetermined value AFRth1 or more. On the other hand, the electronic control unit 200 judges that the fuel feed system 2 is normal and proceeds to the processing of step 3111 if the absolute value of the air-fuel ratio difference AFR is less than the predetermined value AFRth1.

At step S106, the electronic control unit 200 judges if the malfunction of the fuel fee system 2 is light and it is possible to sufficiently correct deviation of the fuel injection amount by correcting the target fuel injection amount QINJ. Specifically, the electronic control unit 200 judges if the absolute value of the air-fuel ratio difference AFR is a predetermined value AFRth2 larger than the above-mentioned predetermined value AFRth1 or becomes more. The electronic control unit 200 judges that the malfunction of the fuel feed system 2 is light and proceeds to the processing of step S107 if the absolute value of the air-fuel ratio difference AFR is less than the predetermined value AFRth2. On the other hand, the electronic control unit 200 judges that the malfunction of the fuel feed system 2 is not light and proceeds to the processing of step S109 if the absolute value of the air-fuel ratio difference AFR is the predetermined value AFRth2 or more.

At step S107, the electronic control unit 200 refers to a table prepared in advance by experiments etc. and calculates a correction coefficient K to be multiplied with the target fuel injection amount QINJ calculated next based on the air-fuel ratio difference AFR. The correction coefficient K is set to an initial value of "1". The electronic control unit 200 sets the correction coefficient K to a value larger than "1" when the air-fuel ratio difference AFR is a positive number, that is, when the actual air-fuel ratio is larger than the presumed air-fuel ratio and the air-fuel ratio of the exhaust is leaner than the usual level, since the target fuel injection amount QINJ has to be corrected to increase it. On the other hand, the electronic control unit 200 sets the correction coefficient K to a value smaller than "1" when the air-fuel ratio difference AFR is a negative number, that is, when the actual air-fuel ratio is smaller than the presumed air-fuel ratio and the air-fuel ratio of the exhaust is richer than the usual level, since the target fuel injection amount QINJ has to be corrected to decrease it.

At step S108, the electronic control unit 200 sets the malfunction judgment execution flag F of the ozone feed system to "1". This is because if the malfunction of the fuel feed system 2 is light and deviation of the fuel injection amount can be sufficiently corrected by correcting the target fuel injection amount QINJ, there is little possibility of mistaken judgment even if judging malfunction of the ozone feed system.

At step S109, the electronic control unit 200 turns on the malfunction indication lamp (MIL) to prompt the driver to repair the fuel feed system 2.

At step S110, the electronic control unit 200 sets the malfunction judgment execution flag F of the ozone feed system to "0". This is because if the malfunction of the fuel feed system 2 is not light, deviation of the fuel injection amount cannot be sufficiently corrected and there is a possibility of mistaken judgment if judging malfunction of the ozone feed system.

At step S111, the electronic control unit 200 sets the correction coefficient K1 to the initial value "1".

At step S112, the electronic control unit 200 sets the malfunction judgment flag of the fuel feed system to "0".

According to the above explained embodiment, the electronic control unit 200 (control device) further comprises a fuel malfunction judging part configures to judge malfunction of the fuel feed system and is configured to judge whether or not to make a judgment of malfunction of the ozone feed system based on the result of judgment of malfunction of the fuel system 2.

Due to this, it is possible to obtain actions and effects similar to the second embodiment and it is possible to prevent it being mistakenly judged that the ozone feed system is malfunctioning despite the fuel feed system 2 malfunctioning when comparing the actual combustion duration and presumed combustion duration to judge if the ozone feed system is malfunctioning in the case where the actual self-ignition timing and the presumed self-ignition timing are separated by a predetermined crank angle Tth or more. For this reason, it is possible to further suppress a drop in the precision of judgment of malfunction of the ozone feed system.

Above, embodiments of the present disclosure were explained, but the above embodiments only show some of the examples of application of the present disclosure. It is not intended to limit the technical scope of the present disclosure to the specific configurations of the above embodiments.

For example, in the first embodiment, the knocking strength detected by the knock sensor 220 was used as representing the combustion noise, but the combustion noise is due to the vibration during combustion, so for example it is also possible to use the maximum value of the cylinder pressure P detected by the cylinder pressure sensor 219 etc. as representing the combustion noise.

Further, in the above embodiments, in calculating the presumed self-ignition timing, the calculation was performed using a processing model including the equation (1), but it is also possible to use a map prepared in advance by experiments etc. and, for example, calculate the timing based on the engine operating state.

The invention claimed is:

1. A control device for an internal combustion engine for controlling an internal combustion engine comprising:
   an engine body;
   a fuel feed system configured to directly feed fuel to a combustion chamber of the engine body; and
   an ozone feed system configured to directly or indirectly feed ozone to the combustion chamber,
   the control device comprises:
      a combustion control part configured to control the fuel feed system and the ozone feed system in a predetermined operating region so as to cause a difference in ozone concentration in the combustion chamber space-wise or time-wise so that the premixed gas burns inside the combustion chamber by compression ignition in stages; and
      an ozone malfunction judging part configured to judge malfunction of the ozone feed system in the predetermined operating region,
   the ozone malfunction judging part comprises:
      a self-ignition timing detecting part configured to detect a self-ignition timing of the premixed gas;
      a presumed self-ignition timing calculating part configured to calculate a presumed self-ignition timing of the premixed gas;
      a combustion noise detecting part configured to detect combustion noise when making a premixed gas burn by compression ignition; and
      a presumed combustion noise calculating part configured to calculate presumed combustion noise when making the premixed gas burn by compression ignition, and
   the ozone malfunction judging part is configured to judge that the ozone feed system is malfunctioning when the self-ignition timing is retarded from the presumed self-ignition timing and the combustion noise is larger than the presumed combustion noise or when the self-ignition timing is advanced from the presumed self-ignition timing and the combustion noise is smaller than the presumed combustion noise.

2. A control device for an internal combustion engine for controlling an internal combustion engine comprising:

an engine body;

a fuel feed system configured to directly feed fuel to a combustion chamber of the engine body; and an ozone feed system configured to directly or indirectly feed ozone to the combustion chamber, the control device comprises:

a combustion control, part configured to control the fuel feed system and the ozone feed system in a predetermined operating region so as to cause a difference in ozone concentration in the combustion chamber space-wise or time-wise so that the premixed gas burns inside the combustion chamber by compression ignition in stages; and an ozone malfunction judging part configured to judge malfunction of the ozone feed system in the predetermined operating region, the ozone malfunction judging part comprises:

a self-ignition timing detecting part configured to detect a self-ignition timing of the premixed gas;

a presumed self-ignition timing calculating part configured to calculate a presumed self-ignition timing of the premixed gas;

a combustion duration detecting part configured to detect a combustion duration when making a premixed gas burn by compression ignition; and a presumed combustion duration calculating part configured to calculate a presumed combustion duration when making the premixed gas burn by compression ignition, and the ozone malfunction judging part is configured to judge that the ozone feed system is malfunctioning when the self-ignition timing is retarded from the presumed self-ignition timing and the combustion duration is shorter than the presumed combustion duration or when the self-ignition timing is advanced from the presumed self-ignition timing and the combustion duration is longer than the presumed combustion duration.

3. The control device for an internal combustion engine according to claim 2, wherein the control device further comprises a fuel malfunction judging part configured to judge malfunction of the fuel feed system and the control device is configured to judge whether or not to make a judgment of malfunction of the ozone feed system by the ozone malfunction judging part based on the result of judgment of malfunction of the fuel feed system.

* * * * *